US010852056B2

(12) United States Patent
Hong

(10) Patent No.: US 10,852,056 B2
(45) Date of Patent: Dec. 1, 2020

(54) DOOR AND HOME APPLIANCE INCLUDING THE SAME

(71) Applicant: LG Electronics Inc., Seoul (KR)

(72) Inventor: Yunki Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 41 days.

(21) Appl. No.: 16/091,354

(22) PCT Filed: Feb. 3, 2017

(86) PCT No.: PCT/KR2017/001197
§ 371 (c)(1),
(2) Date: Oct. 4, 2018

(87) PCT Pub. No.: WO2017/175960
PCT Pub. Date: Oct. 12, 2017

(65) Prior Publication Data
US 2019/0120546 A1     Apr. 25, 2019

(30) Foreign Application Priority Data

Apr. 4, 2016  (KR) .................. 10-2016-0041280

(51) Int. Cl.
F25D 27/00   (2006.01)
F25D 23/02   (2006.01)
(Continued)

(52) U.S. Cl.
CPC .......... *F25D 27/005* (2013.01); *A47F 3/0434* (2013.01); *A47L 15/4257* (2013.01);
(Continued)

(58) Field of Classification Search
None
See application file for complete search history.

(56) References Cited

U.S. PATENT DOCUMENTS

| 6,059,420 A | 5/2000 | Rogers |
| 2011/0134627 A1 | 6/2011 | Hamlin et al. |

(Continued)

FOREIGN PATENT DOCUMENTS

| CN | 204612292 | 9/2015 |
| EP | 3190366 | 7/2017 |

(Continued)

OTHER PUBLICATIONS

EP Search Report in European Application No. EP17779261, dated Oct. 3, 2019, 9 pages.

(Continued)

*Primary Examiner* — Elimito Breval
(74) *Attorney, Agent, or Firm* — Fish & Richardson P.C.

(57) ABSTRACT

The present invention relates to a door and a home appliance including the door. More particularly, the present invention relates to a door including a see-through region and a home appliance comprising the door. According to one embodiment of the present invention, there is provided a home appliance comprising: a cabinet; an object receiving chamber defined in the cabinet to receive an object therein; a door pivotally coupled to the cabinet to open and close the object receiving chamber, wherein the door has a see-through window; a lighting device for illuminating an interior of the object receiving chamber; a sensor disposed in the door for detecting an acoustic wave, wherein the acoustic wave is generated by an application of a knock input to the door; and a controller configured to activate the lighting device upon detecting the knock input, such that the object receiving chamber may be visible to an outside through the see-through window.

24 Claims, 18 Drawing Sheets

(51) Int. Cl.
  *G01H 1/00* (2006.01)
  *G01H 3/00* (2006.01)
  *A47F 3/04* (2006.01)
  *F25D 11/00* (2006.01)
  *F25D 29/00* (2006.01)
  *G01D 5/02* (2006.01)
  *A47L 15/42* (2006.01)
  *D06F 39/14* (2006.01)
  *D06F 49/00* (2006.01)
  *F24C 15/04* (2006.01)

(52) U.S. Cl.
  CPC ............ *D06F 39/14* (2013.01); *D06F 49/003* (2013.01); *F24C 15/04* (2013.01); *F25D 11/00* (2013.01); *F25D 23/025* (2013.01); *F25D 23/028* (2013.01); *F25D 29/005* (2013.01); *G01D 5/02* (2013.01); *G01H 1/00* (2013.01); *G01H 3/00* (2013.01); *F25D 2323/02* (2013.01); *F25D 2323/021* (2013.01); *F25D 2323/023* (2013.01); *F25D 2700/04* (2013.01)

(56) References Cited

U.S. PATENT DOCUMENTS

| | | | | |
|---|---|---|---|---|
| 2012/0260683 | A1* | 10/2012 | Cheon | F25D 29/00 |
| | | | | 62/125 |
| 2014/0109488 | A1 | 4/2014 | Backherms et al. | |
| 2014/0300266 | A1* | 10/2014 | Rindlisbach | F25D 25/027 |
| | | | | 312/408 |
| 2015/0260444 | A1 | 9/2015 | Lee et al. | |
| 2016/0003519 | A1* | 1/2016 | Kim | F25D 29/005 |
| | | | | 362/307 |
| 2016/0051064 | A1 | 2/2016 | Lee et al. | |
| 2016/0061514 | A1* | 3/2016 | Seo | A47F 3/001 |
| | | | | 312/404 |
| 2016/0123657 | A1* | 5/2016 | Kim | F25D 23/04 |
| | | | | 62/125 |
| 2016/0188025 | A1* | 6/2016 | Park | H03K 17/9643 |
| | | | | 52/784.15 |
| 2016/0290713 | A1* | 10/2016 | Twiggar, III | F25D 23/00 |
| 2017/0131022 | A1* | 5/2017 | Fenko | F25D 23/126 |
| 2017/0191723 | A1* | 7/2017 | Gardner | F25C 1/147 |
| 2018/0045442 | A1* | 2/2018 | Park | F25D 25/005 |

FOREIGN PATENT DOCUMENTS

| | | |
|---|---|---|
| JP | 04-347234 | 12/1992 |
| KR | 10199990041832 | 6/1999 |
| KR | 2007033131 | 3/2007 |
| KR | 2013027101 | 3/2013 |
| KR | 2014128098 | 11/2014 |
| WO | WO2007/115587 | 10/2007 |

OTHER PUBLICATIONS international Search Report and Written Opinion in International Application No. PCT/KR2017/001197, dated May 18, 2017, 34 pages.

European Office Action in European Application No. 17779261.1, dated Jul. 2, 2020, 5 pages.

* cited by examiner

DOOR AND HOME APPLIANCE INCLUDING THE SAME

CROSS-REFERENCE TO RELATED APPLICATIONS

This application is a National Stage application under 35 U.S.C. § 371 of International Application No. PCT/KR2017/001197, filed on Feb. 3, 2017, which claims the benefit of Korean Application No. 10-2016-0041280, filed on Apr. 4, 2016. The disclosures of the prior applications are incorporated by reference in their entirety.

TECHNICAL FIELD

The present invention relates to a door and a home appliance including the door. More particularly, the present invention relates to a door including a see-through region and a home appliance comprising the door.

BACKGROUND ART

In general, a home appliance is for providing convenience to users via using electric energy or heat energy. The home appliance may include, for example, a refrigerator, a laundry treatment apparatus and a cooking appliance. Such home appliances may have a door and an object receiving chamber containing an object therein in a cabinet.

The refrigerator has a storage compartment inside the cabinet and a door for opening and closing the storage compartment. The storage compartment may be referred to as an object receiving chamber for refrigerating or freezing and storing food therein. The object as stored in the refrigerator may generally vary between a variety of foods, cosmetics, and pharmaceuticals.

The laundry treatment apparatus has a laundry receiving chamber inside the cabinet and has a door for opening and closing the laundry receiving chamber. Laundry is received in the laundry receiving chamber. Laundry treatment is performed in the chamber. The laundry treatment apparatus may be classified in various ways based on the type of laundry treatment. For example, a washing machine for washing laundry, a dryer for drying laundry, a washer and dryer machine for washing and drying laundry and a refresher that refreshes the laundry are all referred to as the laundry treatment apparatus. In one example, in a drum type laundry treatment apparatus, the drum may be the laundry receiving chamber.

The cooking appliance is a home appliance in which a cavity is provided in a cabinet and a door is provided to open and close the cavity. A object to be cooked is received in the cavity and cooking is performed therein. The cavity may be referred to as an object receiving chamber.

Typically, the door of the home appliance is made opaque. As a result, the user cannot see the inside of the object receiving chamber from the outside. Therefore, the user cannot easily grasp the position or state of the object accommodated in the object receiving chamber.

In the case of a refrigerator, before the user opens the door, the user cannot determine the type and location of the stored object in the storage compartment. Therefore, it takes a considerable amount of time for the user to open the door and search for and retrieve the desired food. This leads to unnecessary energy loss.

A home appliance such as a drum type washing machine or a cooking appliance door such as an oven has a transparent window. Thus, the user can view the inside of the object receiving chamber to some extent.

However, it is common that the inside of the object receiving chamber cannot be seen properly through the transparent window when the ambient environment is dark or at night. Therefore, it is not easy for the user to grasp from outside whether the laundry is properly treated or the cooking is performed properly.

Furthermore, home appliances such as refrigerators, laundry treatment apparatus and cooking appliances may have lighting devices that illuminate the object receiving chamber. This lighting device may be operated to turn on when the door is open. Therefore, the user can easily grasp the inside of the storage compartment in the state that the door is opened. However, when the door is closed, the lighting device is turned off. Therefore, even when the transparent window is provided, the user cannot easily see inside the object receiving chamber when the door is closed.

In recent years, a refrigerator in which only part of a storage compartment is opened has been proposed. For example, a refrigerator which is provided with an auxiliary door for opening and closing an auxiliary storage compartment defined in a main door has been proposed. The auxiliary storage compartment is a portion of the space of the main storage compartment, and is isolated from the main storage compartment by a partition wall. This kind of refrigerator may be referred to as a door-in-door (DID) refrigerator. This DID refrigerator is advantageous in that the outward leakage of cold air from the main storage compartment is considerably reduced when only the auxiliary door is opened.

For example, stored objects, such as beverages, which are frequently taken out of and put back into the storage compartment, are stored in the auxiliary storage compartment, and thus the auxiliary storage compartment can be accessed by opening the auxiliary door while maintaining the main door in the closed state.

There is also a home-bar refrigerator which is equipped with a home-bar door. The home-bar may be considered a very small sized auxiliary storage compartment. Specifically, a small amount of beverages or the like may be stored in the home-bar, which is provided in the rear of the main door through a home-bar door mounted in a very small area of the main door.

A refrigerator in which the home-bar is further enlarged, compared to the home-bar refrigerator, may be referred to as the DID refrigerator.

However, the home-bar refrigerator and the DID refrigerator both have the same problem in that the volume of the auxiliary storage compartment and the amount of objects stored in the auxiliary storage compartment are increased. In other words, it takes a considerable time to open the auxiliary door or the home-bar door and find an object to be taken out, which is inconvenient for the user and increases energy consumption.

DISCLOSURE

Technical Purpose

Accordingly, the present invention has been made keeping in mind the above problems occurring in the prior art.

According to one embodiment of the present invention, there is provided a home appliance that allows the user to view the inside of the object receiving chamber without opening the door since at least a portion of the door for opening and closing the object receiving chamber is transparent.

According to one embodiment of the present invention, there is provided a home appliance that allows the user to see inside the object receiving chamber through the door only if the user want.

According to one embodiment of the present invention, there are provided a door and a home appliance including the door in which a conversion of the door to a see-through door is easily realized, and the door allows the user to easily select a conversion of the door to the see-through door.

According to one embodiment of the present invention, a home appliance is provided in which the door is selectively converted to a see-through door.

According to one embodiment of the present invention, there is provided an easy-to-use home appliance in which a sensor effectively senses the user knocking on the door, that is, the knock input in order for the door to be converted to a see-through door.

According to one embodiment of the present invention, there are provided door and a home appliance including the door, in which even though the position where the user applies the knock input and the position where the sensor senses the knock input are spaced apart from each other, the sensor can effectively detect the knock input.

According to one embodiment of the present invention, there are provided a door and a home appliance including the door, in which the acoustic wave can be diffused via medium substantially throughout the entire the door front face from the position where the user applies the knock input, in particular, in which the medium is monolithic and continuous, enabling effective knock input detection.

According to one embodiment of the present invention, there are provided a door and a home appliance including the door, in which the door is simple in structure via eliminating expensive devices such as touch panels, while effectively detecting the knock input thereto.

According to one embodiment of the present invention, there are provided a door and a home appliance including the door, in which the sensor to sense the knock input is positioned radially outward of the see-through region of the door, which may prevent the see-through region from being blocked by the sensor.

According to one embodiment of the present invention, there are provided a door and a home appliance including the door, in which the door looks like a black display in a normal mode, which may allow an appearance of the door front face to be beautiful, and in which the black display may be converted to a see-through region in a see-through mode, thereby to provide entertainment for the user.

Technical Solution

To achieve the purposes of the present invention, in accordance with one embodiment, there may be provided a home appliance comprising: a cabinet; an object receiving chamber defined in the cabinet to receive an object therein; a door pivotally coupled to the cabinet to open and close the object receiving chamber, wherein the door has a see-through window; a lighting device for illuminating an interior of the object receiving chamber; a sensor disposed in the door for detecting an acoustic wave, wherein the acoustic wave is generated by an application of a knock input to the door; and a controller configured to activate the lighting device upon detecting the knock input, such that the object receiving chamber may be visible to an outside through the see-through window.

The door may include a front panel provided on a front face of the door so that the knock input may be applied to the front panel. The front panel may be configured to transmit therethrough visible light generated from the lighting device.

The sensor may include a sensor device module. The sensor device module may include: a sensor device for sensing the acoustic waves; and a sensor device receptor constructed to receive the sensor device and to be in close contact with the front panel.

The front panel may be composed of a single material-based medium such that the medium may be monolithic and continuous between a knock input occurrence position and a knock input sensed position.

The sensor may include a modular microcomputer provided separately from the controller. The modular microcomputer may be configured to receive the acoustic wave sensed by the sensor device, to determine that an input from a user may be the knock input based on the received wave, and to transmit the determination result to the controller.

The sensor may include a mount member constructed for receiving the sensor device module therein and for allowing the sensor device module to be mounted on the front panel in close contact with the front panel.

The door may include an inner frame coupled to the front panel on a rear of the front panel, the inner frame defines a bezel of the see-through window.

An inner frame hollow portion for defining the see-through window may be formed in a central region of the inner frame.

The bezel may have a through-hole defined therein such that the sensor device module passes through the through-hole forwards from a rear of the inner frame and then may be in close contact with the front panel.

The door may include a door liner coupled to the inner frame on a rear of the inner frame to define a rear face of the door.

A door liner hollow portion for defining the see-through window may be formed in a central region of the door liner.

A door glass may be provided on the door liner hollow portion and may be inserted into the cabinet.

The door may include a printed circuit board (PCB) assembly coupled to the inner frame on a rear of the inner frame, the PCB assembly may be disposed above the door liner.

The door may include a control panel cover coupled to the inner frame on a rear of the PCB assembly to receive the PCB assembly therein, the control panel cover together with the door liner defines a rear face of the door.

A black printed layer may be formed on the bezel.

The sensor may include: a filter for removing noise from a signal received from the sensor device; an amplifier for amplifying a signal output from the filter; and a printed circuit board (PCB) on which the filter and the amplifier are mounted.

The sensor may include: a housing for receiving the PCB; a holder provided on the housing, the holder receives a microphone module therein such that a portion of the microphone module protrudes; and a fastener provided on the housing for coupling the housing to the inner frame.

The sensor device receptor may be made of a rubber material, the coupling via the fastener allows the sensor device receptor to be elastically deformed and thus be in closed contact with the front panel.

The sensor may be configured to sense the knock input only during the home appliance may be operating to treat the object.

The sensor may include: a microphone for sensing an acoustic wave; and a microphone receptor configured to receive the microphone and to be in close contact with the front panel.

The microphone receptor may be in close contact with the front panel so that a sealed space may be defined between the microphone receptor and the front panel to block an external noise.

The sealed space may be defined inside the microphone receptor.

The door may include a support member constructed for receiving the microphone receptor and for allowing the microphone module to be mounted on the front panel to be in close contact with the front panel.

The home appliance may include at least one of a refrigerator, a laundry treatment apparatus, a cooking appliance, and a dishwasher.

To achieve the foregoing purpose, according to one embodiment of the present invention, there may be provided a door with a see-through region, the door comprising: a front panel positioned on a front face of the door; and a sensor provided radially outwardly of the see-through region to sense a knock input to the door, wherein the sensor includes a sensor device module, wherein the sensor device module includes: a sensor device for sensing an acoustic wave, wherein the front panel acts as a medium through which the acoustic wave generated by the knock input transmits; and a sensor device receptor for receiving the sensor device therein and provided to be in close contact with the front panel.

The sensor device receptor may be made of a rubber material. The sensor device may be supported to be in a floated state inside the sensor device receptor.

An upper opening and a lower opening may be defined in the sensor device receptor. An acoustic wave receiver, which is one face of the sensor device, may be constructed to face the upper or lower opening.

The sensor device module may be in close contact with the front panel such that a sealed space may be formed between the upper opening or lower opening of the acoustic wave receiver facing the acoustic wave receiver and the front panel.

Due to the close contact between the sensor device and the sensor device receptor, the sealed space may be disconnected with the lower opening or upper opening which the acoustic wave receiver does not face.

In order to prevent the sealed space from disappearing due to the eccentricity, protrusions may be formed along the perimeter of the lower opening or the upper opening in close contact with the front panel.

The other side of the sensor device may be connected to a signal line. The signal line may extend outwardly through the lower opening or upper opening which the acoustic wave receiver does not face.

The sensor may include a mount member constructed for receiving the sensor device module therein and for allowing the sensor device module to be mounted on the front panel in close contact with the front panel.

The support member may include a holder. The holder may receive the sensor device module. The holder may support the sensor device module to allow the module to be in close contact with the front panel.

The door may include an elastic member to elastically support the holder. The elastic member may be configured to apply an elastic force in a direction of pushing the holder toward the front panel.

The sensor device module may include a signal line extending outwardly from the sensor device. A slot may be formed in the holder. The signal line may be inserted into the slot and then the signal line extends outside the holder.

The support member may include a fulcrum, a first extension extending in one direction from the fulcrum, and a second extension extending in the opposite direction from the fulcrum. The holder may be mounted to the rear of the first extension. The second extension may be provided with an elastic member configured to apply an elastic force to push the second extension forward.

The elastic member may be a spring. On the rear face of the second extension, a projection for supporting the elastic member may be provided.

The support member may include a holder receptor for receiving the holder.

The elastic member may be interposed between the holder and the holder receptor.

To achieve the above-mentioned purpose, according to one embodiment of the present invention, a door may be provided, wherein the door includes a front panel positioned on a front face of the door and subject to knock input from the user; and a sensor provided in close contact with the front panel for sensing the knock input therefrom. The sensor may include a sensor device module. The sensor device module may include: a sensor device for sensing the acoustic waves; and a sensor device receptor constructed to receive the sensor device and to be in close contact with the front panel. The front panel may be composed of a single material-based medium such that the medium may be monolithic and continuous between a knock input occurrence position and a knock input sensed position.

The sensor device receptor may be in close contact with the front panel so that a sealed space may be defined between the sensor device receptor and the front panel to block an external noise.

The sealed space may be defined inside the sensor device receptor.

The door may include a support member constructed for receiving the sensor device module and for allowing the sensor device module to be mounted on the front panel to be in close contact with the front panel.

The door may be pivotally connected to the cabinet, thereby opening and closing the object receiving chamber. The door may be applied to a home appliance such as a refrigerator, a laundry treatment apparatus, a dishwasher, and a cooking appliance.

To achieve the above-mentioned purpose, according to one embodiment of the present invention, a home appliance may be provided, wherein the home appliance may include: a cabinet having an object receiving chamber defined therein;

a lighting device for illuminating an interior of the object receiving chamber;

a door including a panel assembly having a front panel positioned on a front face of the door, wherein the door is pivotally connected to the cabinet for opening and closing the object receiving chamber, wherein the front panel has an opening or a hollow portion defined therein;

a sensor comprising a sensor device for sensing an acoustic wave that is generated from the knock input to the door and is transmitted through the front panel; and a controller configured to activate the lighting device upon detecting the knock input to allow light to transmit the panel assembly, such that the object receiving chamber may be visible to an outside of the door through the opening or the hollow portion (the see-through window), wherein the sensor comprises a modular microcomputer provided separately from the controller, wherein the modular microcomputer is configured to determine whether or not a normal knock input is performed based on a signal from the sensor device, and to transmit the determination result to the controller.

The object receiving chamber may be variously named depending on the type of home appliance. In the refrigerator, laundry treatment apparatus, cooking appliance, and dishwasher, the object receiving chambers may be referred to as the storage compartment, tub or drum, chamber, and tub, respectively.

The modular microcomputer may determine that a corresponding input is a normal knock on input when it is detected from the sensor device that the user has performed knock input two or more times at an interval within a predetermined time.

To achieve the above-mentioned purpose, according to one embodiment of the present invention, a home appliance may be provided, wherein the home appliance may include: a cabinet having an object receiving chamber defined therein; a lighting device for illuminating an interior of the object receiving chamber; a door including a panel assembly having a front panel positioned on a front face of the door, wherein the door is pivotally connected to the cabinet for opening and closing the object receiving chamber, wherein the door has a see-through region; a sensor comprising a sensor device for sensing an acoustic wave that is generated from the knock input to the door and is transmitted through the front panel; and a controller configured to activate the lighting device upon detecting the knock input to allow light to transmit the panel assembly, such that the object receiving chamber may be visible to an outside of the door through the see-through region, wherein the sensor comprises a modular microcomputer provided separately from the controller, wherein the modular microcomputer is configured to determine whether or not a normal knock input is performed based on a signal from the sensor device, and to transmit the determination result to the controller.

To achieve the above-mentioned purpose, according to one embodiment of the present invention, a home appliance may be provided, wherein the home appliance may include: a cabinet having an object receiving chamber defined therein; a lighting device for illuminating an interior of the object receiving chamber;

a door including a panel assembly having a front panel positioned on a front face of the door, wherein the door is pivotally connected to the cabinet for opening and closing the object receiving chamber, wherein the door has a see-through region;

a sensor comprising a sensor device for sensing an acoustic wave that is generated from the knock input to the door and is transmitted through the front panel; and a controller configured to activate the lighting device upon detecting the knock input to allow light to transmit the panel assembly, such that the object receiving chamber may be visible to an outside of the door through the see-through region, wherein the sensor device is positioned radially outward of the see-through region of the door.

The sensor may include a modular microcomputer provided separately from the controller, wherein the modular microcomputer may be configured to determine whether or not a normal knock input is performed based on a signal from the sensor device, and to transmit the determination result to the controller.

Advantageous Effects

According to one embodiment of the present invention, the home appliance may allow the user to view the inside of the object receiving chamber without opening the door since at least a portion of the door for opening and closing the object receiving chamber is transparent.

According to one embodiment of the present invention, the home appliance may allow the user to see inside the object receiving chamber through the door only if the user want.

According to one embodiment of the present invention, a conversion of the door to a see-through door may be easily realized, and the door may allow the user to easily select the conversion of the door to the see-through door.

According to one embodiment of the present invention, the door may be selectively converted to a see-through door.

According to one embodiment of the present invention, the easy-to-use home appliance may be realized in which the sensor effectively senses the user knocking on the door, that is, the knock input in order for the door to be converted to the see-through door.

According to one embodiment of the present invention, even though the position where the user applies the knock input and the position where the sensor senses the knock input are spaced apart from each other, the sensor can effectively detect the knock input.

According to one embodiment of the present invention, the acoustic wave can be diffused via medium substantially throughout the entire the door front face from the position where the user applies the knock input. In particular, the medium may be monolithic and continuous, thereby enabling effective knock input detection.

According to one embodiment of the present invention the door may be simple in structure via eliminating expensive devices such as touch panels, while effectively detecting the knock input thereto.

According to one embodiment of the present invention, the sensor to sense the knock input may be positioned radially outward of the see-through region of the door, which may prevent the see-through region from being blocked by the sensor.

According to one embodiment of the present invention, the door looks like a black display in a normal mode, which may allow an appearance of the door front face to be beautiful. Further, the black display may be converted to a see-through region in a see-through mode, thereby to provide entertainment for the user.

BEST MODE

Figure 1:
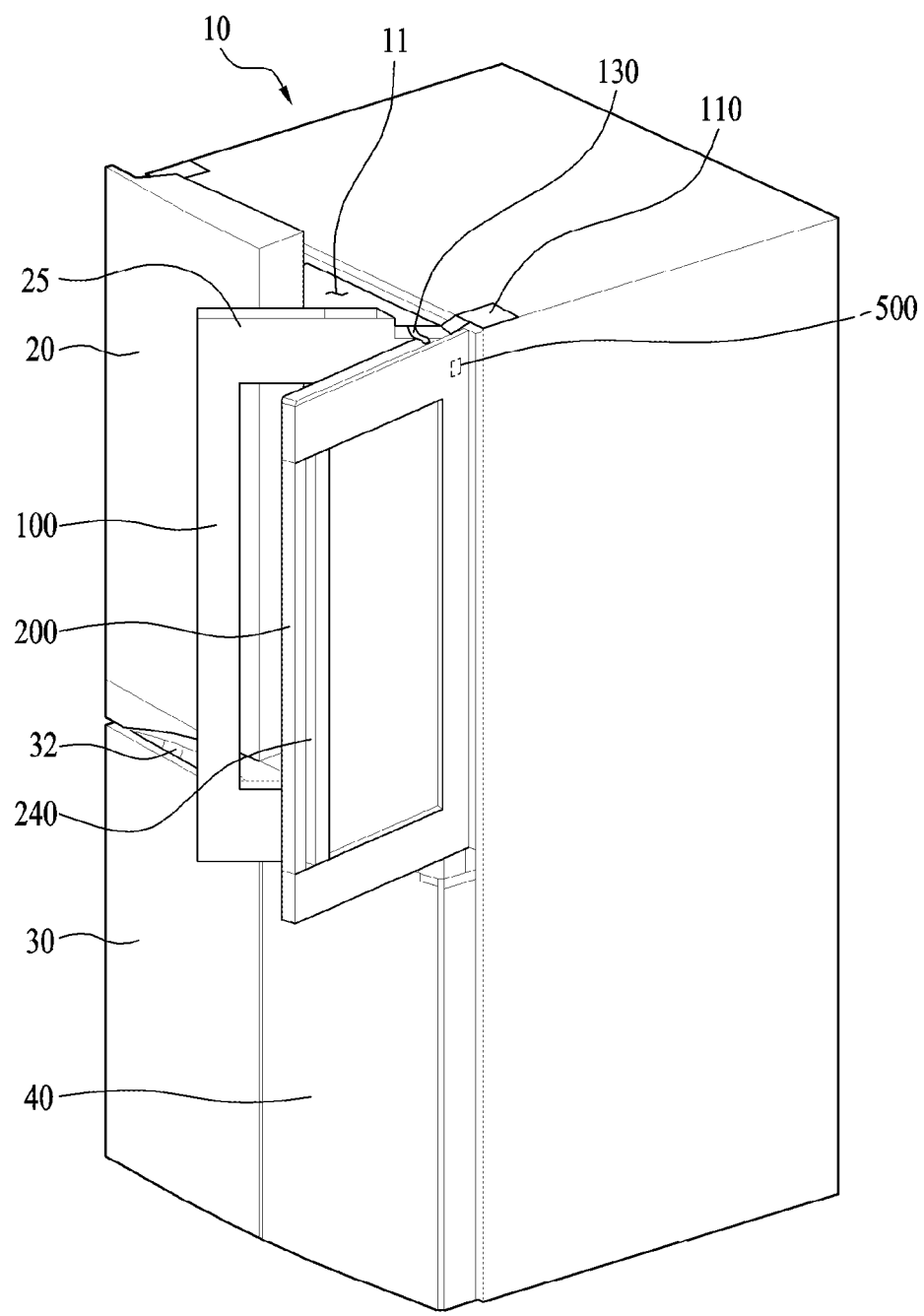
FIG. 1 is a perspective view showing a home appliance (refrigerator) according to a first embodiment of the present invention.

Reference will now be made in detail to the preferred embodiments of the present invention, examples of which are illustrated in the accompanying drawings.

First, in an example of a door and a home appliance that may be applied to the present invention, an embodiment of a refrigerator door and a refrigerator including the door is described.

The embodiments of the present invention are not limited to the above-mentioned type refrigerators. In other words, a main door adapted to open and close a refrigerating compartment or a freezing compartment may be a see-through door, or an auxiliary door adapted to open and close an auxiliary storage compartment or a home-bar door may be a see-through door. Since a home-bar door is also hingedly coupled to the main door, such a home-bar door may be alternatively referred to as an auxiliary door.

FIGS. 1 to 4 are views showing a refrigerator according to a first embodiment of the present invention.

The refrigerator shown in the drawings is a bottom-freezer type refrigerator in which a refrigerating compartment is provided at an upper position of a cabinet 10 and a freezing compartment is provided at a lower position of the cabinet 10. The refrigerating compartment or the freezing compartment may be considered part of the storage compartment or the main storage compartment 11 defined in the cabinet 10.

As described above, the present invention is not limited to this type of refrigerator. The present invention may be applied to any type of refrigerator as long as the refrigerator includes a door for opening and closing the storage compartment.

In the embodiment shown in the drawings, a left refrigerating compartment door 20 and a right refrigerating compartment door 25, which serve as doors for opening and closing the refrigerating compartment, are hingedly coupled to the left side and the right side of the cabinet 10. Alternatively, a single refrigerating compartment door may be hingedly coupled to the cabinet 10.

The left refrigerating compartment door 20 is an opaque door including a handle groove provided at the lower end thereof. In contrast, the right refrigerating compartment door 25 selectively becomes transparent such that a user can see the interior through the door 25. In other words, the right refrigerating compartment door 25 may be embodied as a see-through door.

Freezing compartment doors, which are provided under the refrigerating compartment door, may also include a left freezing compartment door 30 and a right freezing compartment door 40, which are hingedly coupled to respective sides of the lower portion of the front surface of the cabinet 10. Alternatively, a single freezing compartment door may be hingedly coupled to the cabinet 10, or a drawer type door may be mounted in the cabinet 10 so as to be pulled forward from the cabinet 10 and pushed rearward into the cabinet 10.

The left freezing compartment door 30 may be provided at the upper surface thereof with a handle groove 32, and the right freezing compartment door 40 may also be provided at the upper surface thereof with a handle groove.

Referring to FIG. 1, an embodiment in which some of the doors are embodied as see-through doors is shown. However, any door, which can be provided at a refrigerator, may be embodied as a see-through door, regardless of whether it opens and closes a refrigerating compartment or a freezing compartment, and regardless of whether it opens and closes a main storage compartment or an auxiliary storage compartment.

As shown in FIG. 1, the right refrigerating compartment door 25 may include a main door 100, hingedly coupled to one side of the cabinet 10 by means of a main door hinge 110, and an auxiliary door 200, hingedly coupled to the main door 100 or the cabinet 10 by means of an auxiliary door hinge 100. In other words, the refrigerating compartment may be accessed by opening both the main door 100 and the auxiliary door 200.

The main door 100 may be provided at the center with an opening, and may be provided at the back surface thereof with an auxiliary storage compartment (not shown).

Accordingly, when the auxiliary door 200 is opened, the auxiliary storage compartment may be accessed through the opening in the main door 100. In other words, a user can access the auxiliary storage compartment by opening only the auxiliary door 200 without having to open the main door 100.

The auxiliary storage compartment may be defined by a plurality of baskets (not shown) installed at different levels. Specifically, a cover (not shown) adapted to surround the plurality of baskets may be provided. The cover may serve as a partition wall for isolating the auxiliary storage compartment and the main storage compartment from each other. Accordingly, the auxiliary storage compartment may be positioned in front of the main storage compartment.

Figure 2:
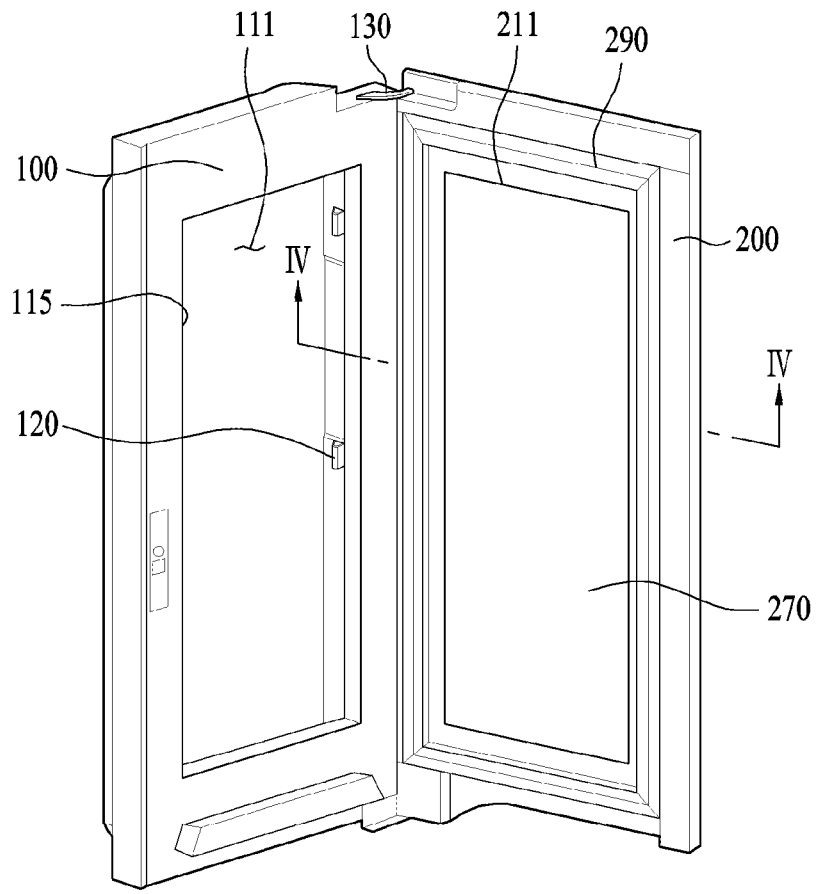
FIG. 2 is a perspective view showing the right door of the refrigerating compartment shown in FIG. 1, which is removed from the refrigerator.

As shown in FIG. 2, a plurality of mounting protrusions 120 for mounting a plurality of baskets (not shown) may be provided at rear regions of the inner surfaces of the opening 115 in the main door 100. The plurality of baskets may be two or three baskets, which are vertically spaced apart from each other by predetermined distances. Accordingly, a user can access the auxiliary storage compartment by opening the auxiliary door 200 while leaving the main door 100 closed. When the auxiliary door 200 is opened together with the main door 100, the auxiliary storage compartment 111 is, of course, rotated together with the main door 100. Therefore, a user can access the main storage compartment provided behind the auxiliary storage compartment 111.

Since the relationship between the main door and the auxiliary door and the relationship between the main storage compartment and the auxiliary storage compartment are common in a DID refrigerator, descriptions thereof are omitted.

The auxiliary door 200 is internally provided with a panel assembly 270 that selectively becomes transparent. Although the panel assembly may be constituted by a single panel, the panel assembly is preferably constituted by a plurality of panels. The panel assembly 270 may be selectively changed into a see-through panel assembly, and, as such, a user can see the internal space behind the door through the panel assembly 270.

When the main door 100 and the auxiliary door 200 are integrally formed into a single door, unlike the construction shown in the drawings, a user can see the main storage compartment through the panel assembly 270. In this case, the main door 100 may be just the cabinet 10, and the auxiliary door 200 may be considered the door for opening and closing the storage compartment. In other words, the opening formed in the main door 100 may be considered to be an opening formed in the cabinet 10.

As shown in FIG. 1, the auxiliary door 200 may be provided with a groove-shaped handle 240 formed at the left side of the panel assembly 270. The handle 240 may be vertically elongated and may be the same length as the panel assembly 270. The auxiliary door 200 may, of course, be the left auxiliary door provided at the left side of the cabinet 10. In this case, the handle 240 may be positioned at the opposite side.

The auxiliary door 200 may be rotated in the same direction as the main door 100. Specifically, the main door 100 and the auxiliary door 200 may be rotated about a vertical rotating shaft, as shown in FIG. 2. However, the auxiliary door 200 may be configured to be rotated about a horizontal rotating shaft like a home-bar.

Generally, the cabinet of the refrigerator is provided at the front surface thereof with a door switch (not shown) for detecting opening in the door, and the storage compartment is provided therein with a lighting device (not shown) for illuminating the interior of the storage compartment when the door is opened.

According to the embodiment of the present invention, the door is preferably changed into a see-through door by activation of the lighting device. Specifically, the door is preferably changed into a see-through door by the lighting device provided in the main storage compartment and/or the auxiliary storage compartment such that the interior of the storage compartment becomes visible from the outside.

More specifically, it is preferable that the interior of the storage compartment become invisible upon deactivation of the lighting device and become visible upon activation of the lighting device. The interior of a room is not made clearly visible through a window glass by a bright outside. However, when the interior of the room is illuminated with a bright light, the interior of the room is clearly visible through the window glass. The see-through door utilizes this principle. The conversion of the see-through door is preferably performed by input of a user's command. Specifically, the door is preferably changed into a see-through door when a specific command is input to the refrigerator by a user.

The control process and control architecture associated with the conversion of the see-through door will be described later.

The specific construction of the auxiliary door 200 is described with reference to FIGS. 3 and 4. As described above, the auxiliary door 200 may be simply the main door for opening and closing the storage compartment. As shown in FIG. 1, if the auxiliary door is hingedly coupled to the main door or the cabinet, the auxiliary door 200 may be superimposed on the main door 100. In other words, the entire area of the auxiliary door 200 may overlap the entire area of the main door 100. At this point, the entire area of the main door 100 is covered by the entire area of the auxiliary door 200. Accordingly, since the main door 100 is shielded by the auxiliary door 200, the auxiliary door 200 defines the appearance of the front face of the refrigerator.

The auxiliary door 200 includes a door frame 205 having a central opening 211. The door frame 205 constitutes the peripheral portion or the marginal portion of the auxiliary door 200. In other words, the door frame 205 constitutes upper and lower marginal portions and both lateral side marginal portions of the auxiliary door 200.

Specifically, the door frame 205 may include an outer door 210 constituting the marginal portion of the front face of the door and a door liner 280 constituting the marginal portion of the rear face of the door. The outer door 210 and the door liner 280 may also be provided with respective openings corresponding to the opening 211.

The door frame 205 may include cap decorations 260, which are respectively coupled to the upper ends and lower ends of the outer door 210 and the door liner 280. The outer door 210, the door liner 280 and the cap decorations 260 may constitute a door having a predetermined thickness and an internal space.

In conventional refrigerators, the internal space defined between the outer door 210, the door liner 280 and the cap decorations 260 is typically filled with foamed material for thermal insulation. The door according to the embodiment, particularly the auxiliary door 200, preferably further includes the panel assembly 270 in addition to the door frame 205. Preferably, further provided is a panel assembly 270 adapted to be converted into a see-through door. As described hereinafter, the panel assembly 270 is preferably constructed to have a thermal insulation function.

The panel assembly 270 is preferably provided at the central portion of the auxiliary door 200. Particularly, the panel assembly 270 is preferably configured to correspond to the opening in the door frame 205.

In order to mount the panel assembly 270, the door frame 205 may further include an inner frame 230 interposed between the outer door 210 and the door liner 280. The inner frame 230 may also be provided at the center area thereof with an opening corresponding to the opening 211 in the door frame 205.

The door frame 205 may further include a door decoration 220. The door decoration 220 may be mounted on the peripheral area of the opening in the door frame 205 so as to substantially define the opening 211 in the door frame 205.

The auxiliary door 200 may further include an upper hinge bracket 254 and a lower hinge bracket 256 in addition to the panel assembly 270 so as to make the auxiliary door 200 rotatable. The auxiliary door 200 may include a handle 240, which enables a user to open and close the auxiliary door 200 while grasping the auxiliary door 200. The auxiliary door 200 may further include a support 250.

Hereinafter, the process of assembling the auxiliary door 200 will be described with reference to FIG. 4.

The outer door 210 is first assembled with the door decoration 220, and the handle 240 is then coupled to the assembly. A handle support 245 may be interposed between the handle 240 and the outer door 210 or the door decoration 220. The handle support 245 may be constituted by a metal rod so as to reinforce the rigidity of the handle 240. The door decoration 220 may be coupled to the rear surface of the outer door 210. In the embodiment, the handle 240 may be coupled to the left end of the outer door 210 when viewed in FIG. 4.

Subsequently, the inner frame 230 is assembled with the rear surface of the outer door 210, and the supports 250 are assembled with the hinge brackets 254 and 256.

The supports 250 are provided at upper and lower ends of the panel assembly 270, and the supports 250 may be provided to correspond to the four corners of the opening 211. The supports 250 are provided to correspond to the four corners of the panel assembly 270 so as to protect the panel assembly 270. In other words, the supports 250 support the panel assembly 270 such that the weight of the panel assembly 270 is uniformly distributed to the door frame 205.

The supports 250 are assembled with the hinge brackets 254 and 256. Accordingly, the supports 250 further serve to reinforce the strength of the hinge regions.

Thereafter, the cap decorations 260 are coupled to the outer door 210 from the rear. The cap decorations 260 may be coupled to the outer door 210 by being respectively fitted on the upper and lower ends of the outer door 210.

Subsequently, the panel assembly 270 may be coupled to the outer door 210 from the rear, and the door liner 280 may be coupled to the outer door 210 from the rear. Specifically, the door liner 280 may be securely coupled to the outer door 210 by means of screws.

Finally, a gasket 290 is mounted on the rear surface of the door liner 280, thus completing the assembly of the auxiliary door 200.

The upper hinge bracket 254 and the lower hinge bracket 256 may be provided with respective auxiliary door hinges 130 coupled thereto. When the auxiliary door 200 is closed with respect to the main door 100, the gasket 290 serves to seal the clearance therebetween, thus preventing the leakage of cold air through the clearance.

Figure 3:
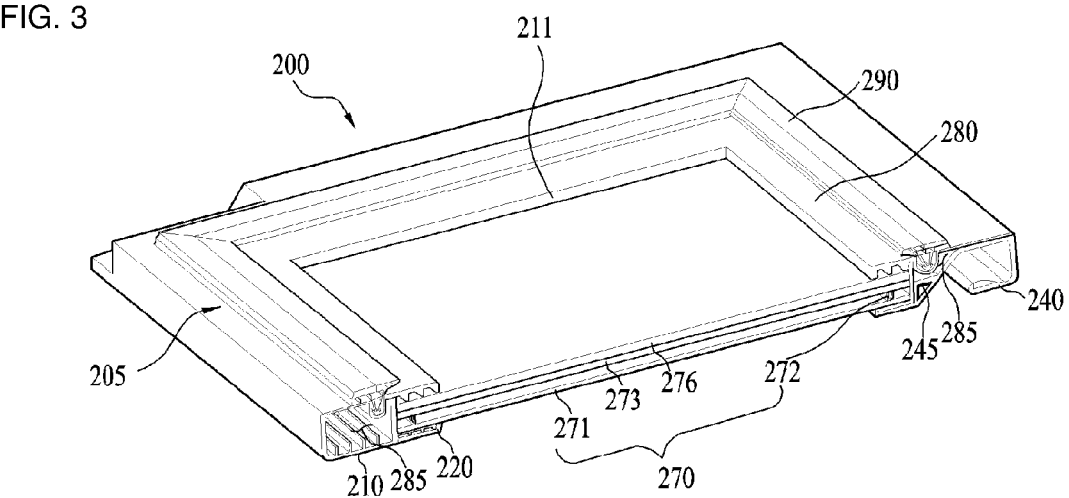
FIG. 3 is a perspective view of the right door, which is cut away along line IV-IV of FIG. 2.
Figure 4:
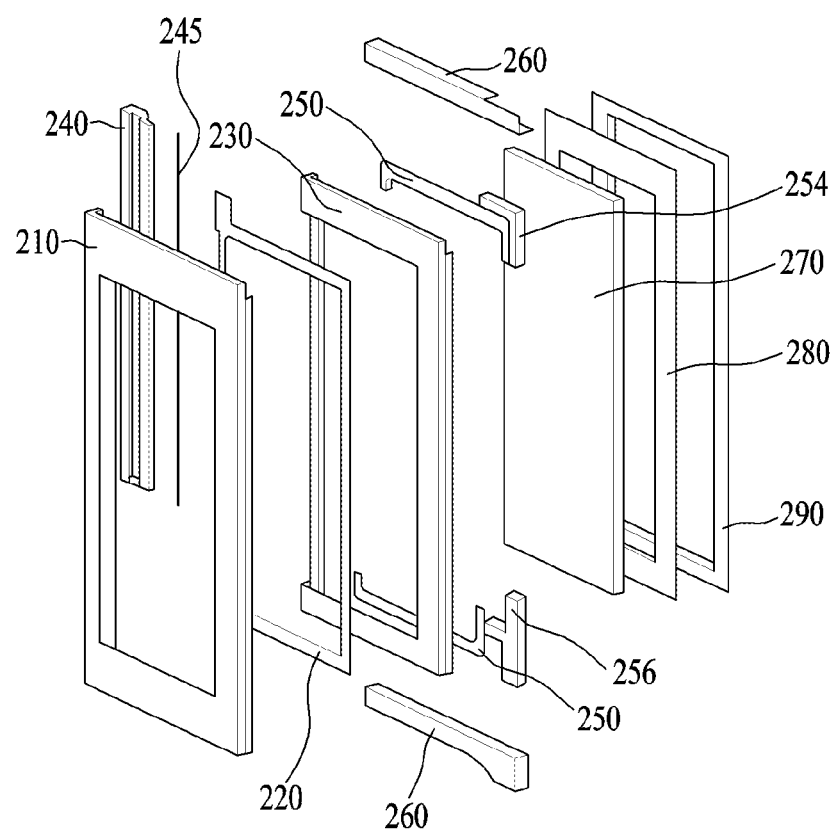
FIG. 4 is an exploded perspective view of a door (auxiliary door) of FIG. 2.

As shown in FIG. 3, the panel assembly 270 may include a front panel 271, which is exposed from the front surface of the auxiliary door 200. The front panel 271 may be made of a transparent material, and its rear surface may have a metal vapor-deposited thereon. The deposited metal layer may function to make the front panel 271 opaque when light is not transmitted therethrough and make the front panel 271 transparent when light is transmitted therethrough.

Of course, the front panel 271 may include a color coating film, or may be constituted by a color panel. Specifically, although the front panel 271 is opaque under low-intensity light conditions, the front panel 271 may become transparent under relatively high-intensity light conditions.

This means that the front panel 271 is opaque when the lighting device behind the front panel 271 is deactivated, and is converted into a transparent panel, that is, a see-through door, when the lighting device is activated. Accordingly, although the interior of the storage compartment becomes invisible when the interior is dark, the interior of the storage compartment becomes visible through the front panel 271 when the interior is bright.

The panel assembly 270 may include a thermal insulation panel provided behind the front panel 271. The thermal insulation panel may include a plurality of thermal insulation panels. FIG. 3 shows an example in which two thermal insulation panels 273 and 276 are provided. A spacer rod 272 may be disposed between the front panel 271 and the thermal insulation panel 273.

The front panel 271, which is made of a transparent material, is mounted at the central opening in the auxiliary door 200 so as to constitute the front surface of the auxiliary door 200.

The internal space defined in the door frame 205 of the auxiliary door 200 excluding the panel assembly 270 is preferably filled with a thermal insulation material. Specifically, the space between the outer door 210 and the door liner 280, that is, the space 285 provided at the marginal portion of the auxiliary door 200, may be filled with a thermal insulation material so as to prevent cold air from leaking between the gasket 290 and the panel assembly 270.

Accordingly, the marginal portion of the auxiliary door 200 is thermally insulated by the thermal insulation material, for example, polyurethane, and the central portion of the auxiliary door 200 is thermally insulated by the thermal insulation panels 273 and 276.

The space 285 is filled with the foamed material after the auxiliary door 200 is completely assembled, thus implementing secure coupling between the outer door 210 and the door liner 280.

The structure and the process of fabricating the panel assembly 270 will be described in detail later.

FIGS. 5 to 8 are views showing a refrigerator according to a second embodiment of the present invention.

Figure 5:
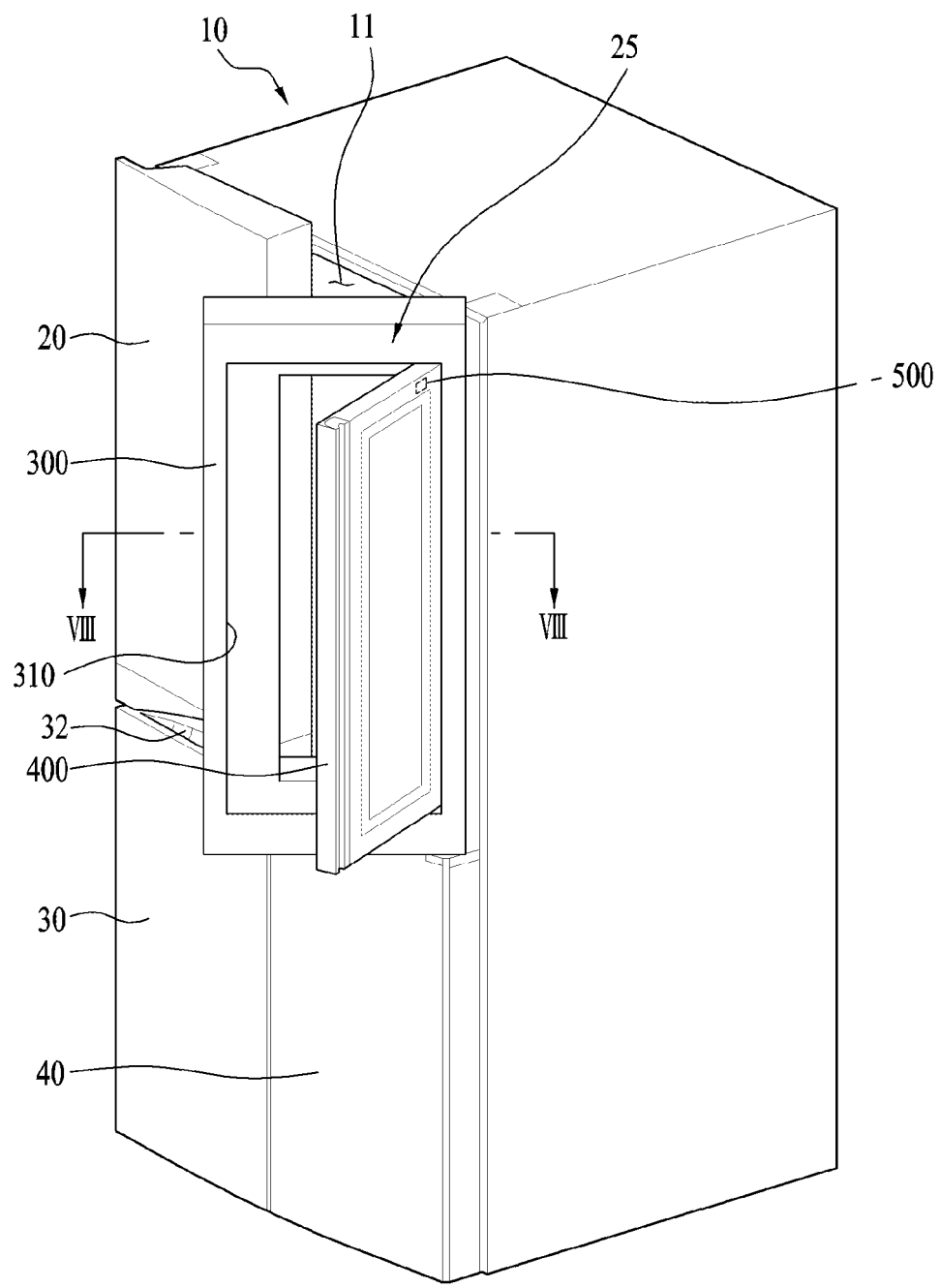
FIG. 5 is a perspective view showing a home appliance (refrigerator) according to a second embodiment of the present invention.
Figure 6:
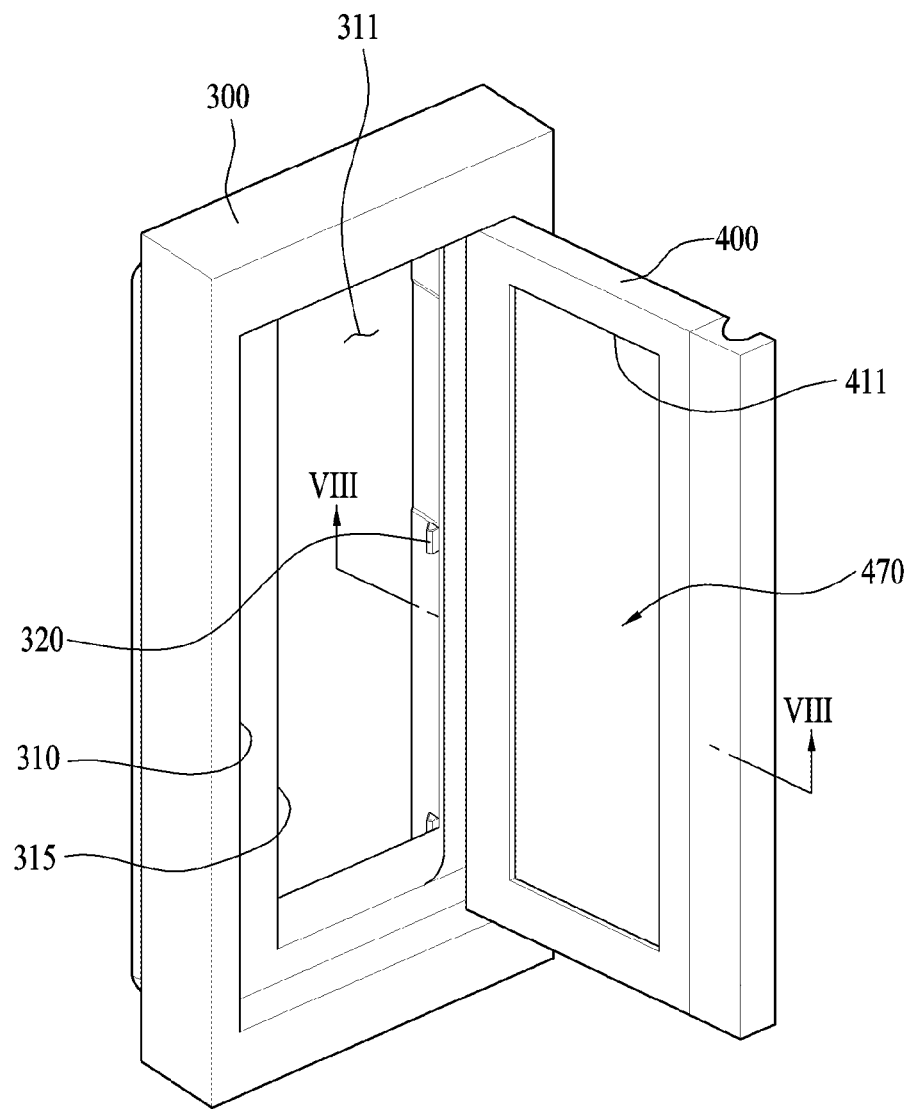
FIG. 6 is a perspective view showing the right door of the refrigerating compartment shown in FIG. 5, which is removed from the refrigerator.

As shown in FIGS. 5 and 6, a right refrigerating compartment door 25 of the refrigerator according to the second embodiment includes a main door 300, which is hingedly coupled to the cabinet 11 and has therein a central opening, and an auxiliary door 400, fitted in the opening in the main door 300 and hingedly coupled thereto.

In the refrigerator according to the first embodiment, the main door and the auxiliary door are the same size when viewed from the front, and the auxiliary door overlaps the main door when the auxiliary door is closed.

In contrast, in the refrigerator according to the second embodiment, the auxiliary door 400 is configured to have a smaller size than that of the main door 300, and is fitted into the opening 310 in the main door 300 when the auxiliary door 400 is closed.

Specifically, in the first embodiment, the auxiliary door 200 is exposed to the front of the main door 100 when the auxiliary door 200 is closed with respect to the main door 100. In the second embodiment, the auxiliary door 400 is fitted in the main door 3000 when the auxiliary door 400 is closed with respect to the main door 300. The former may be referred to as an outside type auxiliary door, and the latter may be referred to as an inside type auxiliary door.

Likewise, in this embodiment, the main door 300 may simply be the cabinet. In this case, the auxiliary door 300 may be considered to be a door for opening and closing the storage compartment 11.

As shown in FIG. 6, the main door 300 may be provided at the center thereof with an opening 315, and may be provided at the rear surface thereof with an auxiliary storage compartment 311. In other words, the main door 300 may be provided with an opening 310 into which the auxiliary door 400 is fitted and the opening 315 for allowing access to the auxiliary storage compartment 311. A stepped portion is defined between the two openings 310 and 315. In other words, the opening 315 for allowing access to the auxiliary storage compartment 311 may be positioned inside the opening 310 in the radial direction into which the auxiliary door 400 is fitted.

When the auxiliary door 400 is opened, it is possible to access the auxiliary storage compartment 311 through the opening 315 in the main door 300. That is to say, the auxiliary storage compartment 311 may be accessed by opening only the auxiliary door 400, without having to open the main door 300.

The auxiliary storage compartment may be defined by a plurality of baskets (not shown) installed at different levels. Specifically, a cover (not shown) adapted to surround the plurality of baskets may be provided. The cover may serve as a partition wall for isolating the auxiliary storage compartment and the main storage compartment from each other. Accordingly, the auxiliary storage compartment may be positioned in front of the main storage compartment.

As shown in FIG. 6, a plurality of mounting protrusions 320 for mounting a plurality of baskets (not shown) may be provided at rear regions of the inner surfaces of the opening 315 in the main door 300. The plurality of baskets may be two or three baskets, which are vertically spaced apart from each other by predetermined distances. Accordingly, a user can access the auxiliary storage compartment 311 by opening the auxiliary door 400 while leaving the main door 300 closed, as shown in FIG. 6.

Since the relationship between the main door and the auxiliary door and the relationship between the main storage compartment and the auxiliary storage compartment are common in a DID refrigerator, descriptions thereof are omitted.

The auxiliary door 400 is internally provided with a panel assembly 470 that selectively becomes transparent. Although the panel assembly may be constituted by a single panel, the panel assembly is preferably constituted by a plurality of panels as described hereinafter. The panel assembly 470 may be selectively changed into a see-through panel assembly, and as such, a user can see the internal space behind the door through the panel assembly 470.

More specifically, the auxiliary storage compartment 311 is visible through the panel assembly provided at the opening 411 of the auxiliary door 400 and the opening 315 provided in the main door 300. It is possible to see the interior of the auxiliary storage compartment 311 even in the state in which the auxiliary door 400 is closed, and it is possible to easily perceive where a specific object is positioned in the auxiliary storage compartment 311. Thereafter, a user can easily take a desired object out of the auxiliary storage compartment 311 by opening the auxiliary door 400.

For example, assuming that 12 similar objects are stored in the auxiliary storage compartment 311 in a 4×4 matrix, a somewhat long period of time may be required to open the auxiliary door 400, find a desired specific object among the 12 similar objects and take the desired object out of the auxiliary storage compartment 311. However, in the case where the 12 similar objects are visible from the outside, there is no need to take time to find and select the specific object. Specifically, since a user has already seen the position of the specific object, the user can quickly take out the specific object after merely opening the auxiliary door 400. Therefore, it is possible to minimize the loss of cold air and to improve the user's convenience.

Hereinafter, the structure of the auxiliary door 400 will be described in detail with reference to FIGS. 7 and 8.

The auxiliary door 400 according to this embodiment includes a door frame 405 having a central opening 411.

The door frame 405 may include an inner frame 410 constituting the marginal region of the rear side of the auxiliary door 400, and a door liner 480, coupled to the inner frame 410 to constitute the marginal region of the rear surface of the auxiliary door 400.

Unlike the first embodiment, the inner frame 410 and the door liner 480 may be integrally formed with portions corresponding to cap decorations provided at the upper and lower ends thereof without providing separate cap decorations.

Supports 450 may be respectively disposed between upper ends of the inner frame 410 and the door liner 480 and between the lower ends of the inner frame 410 and the door liner 480.

An upper hinge bracket 454 and a lower hinge bracket 456 may be respectively coupled to one side of the upper support 450 and one side of the lower support 450, auxiliary door hinges may be respectively coupled to the upper hinge bracket 454 and the lower hinge bracket 456.

Unlike the construction shown in the drawings, the cap decorations may be respectively coupled to upper ends and lower ends of the inner frame 410 and the door liner 480, and upper and lower hinges (not shown) may be directly coupled to the cap decorations.

The door liner 480 may be provided at the rear surface thereof with a groove in which a gasket 490 is fitted. When the auxiliary door 400 is closed with respect to the main door 300, the gasket 490 serves to seal the clearance between the auxiliary door 400 and the main door 300, thus preventing the leakage of cold air. Specifically, the gasket 490 may be disposed at the position between the two openings 310 and 315.

Figure 7:
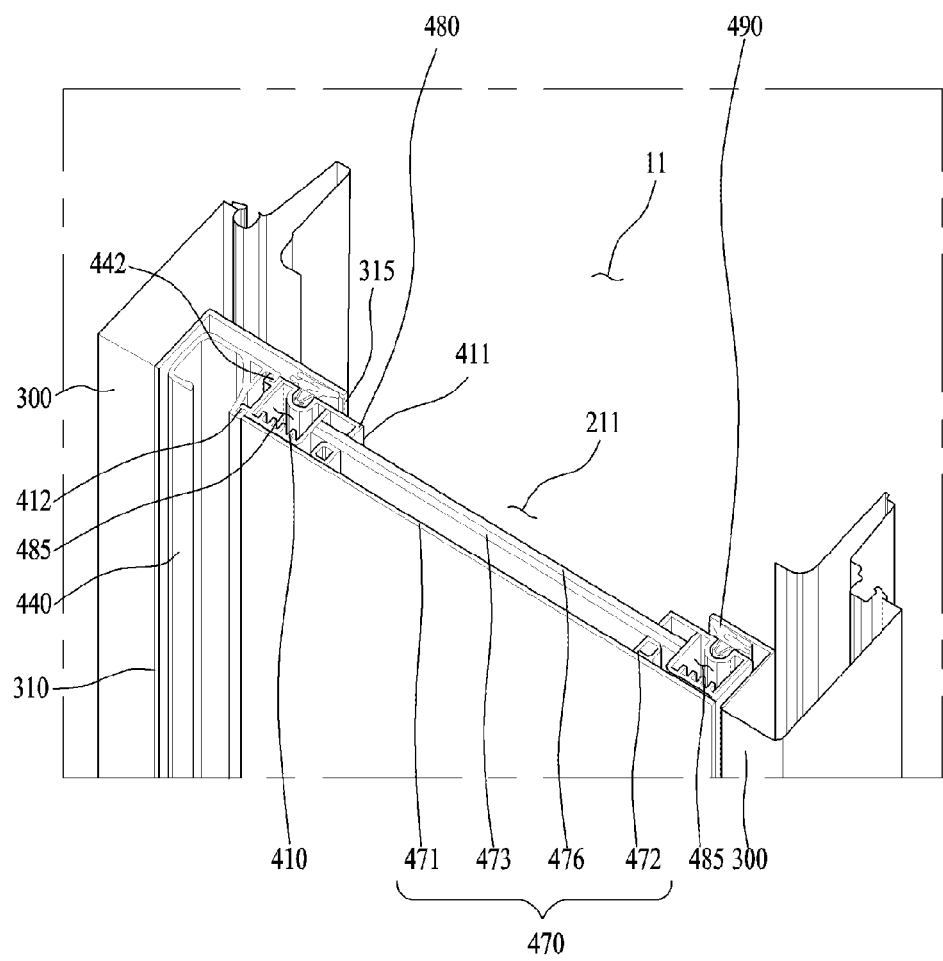
FIG. 7 is a perspective view of the right door, which is cut away along line VIII-VIII of FIG. 6.
Figure 8:
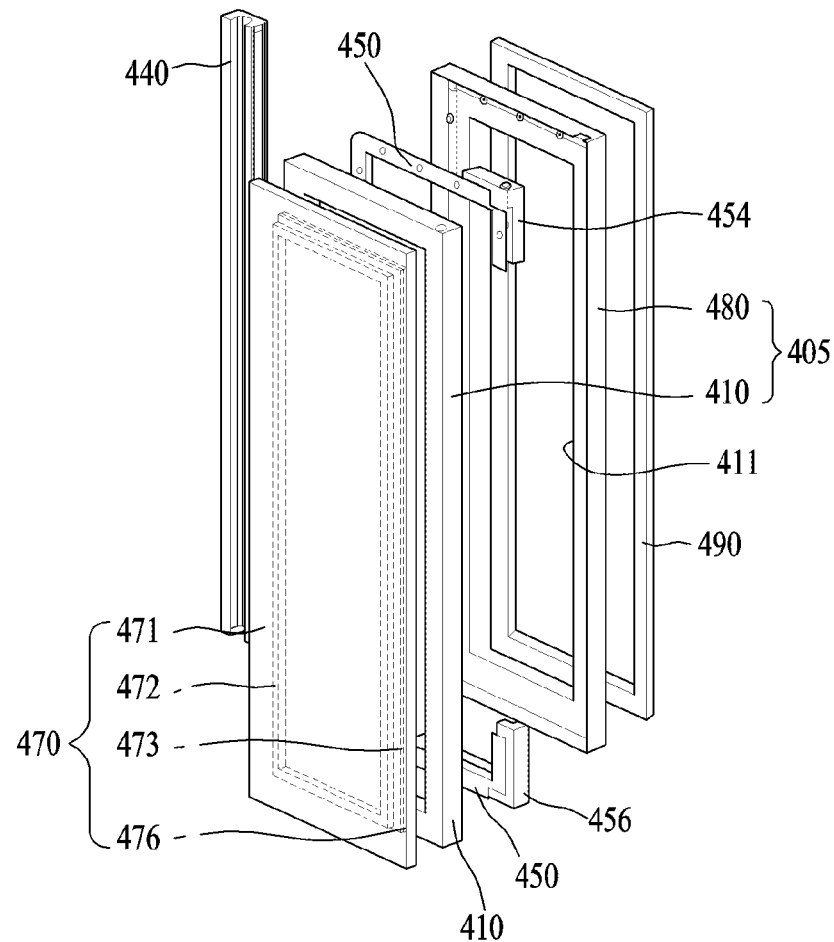
FIG. 8 is an exploded perspective view of a door (auxiliary door) of FIG. 6.

As shown in FIGS. 7 and 8, the panel assembly 470 of the auxiliary door 400 according to the second embodiment is coupled to the front surface of the auxiliary door 400. Specifically, the panel assembly 470 may be coupled to the inner frame 410 from the front.

The panel assembly 470 may be identical or similar to the panel assembly of the first embodiment. However, the front panel 471 of the panel assembly 470 according to this embodiment is distinguished from the first embodiment in that the front panel 471 is not covered at the marginal area thereof with the outer door 210 but is coupled to the front surface of the inner frame 410 having the opening.

In the first embodiment, the marginal region of the front surface of the auxiliary door 200 is constituted by the outer door 210 and the central region of the front surface of the auxiliary door 200 is constituted by the front panel 271. According to the second embodiment, the front surface of the auxiliary door 400 is preferably constituted by the front panel 471. In other words, the marginal region and the central region of the front surface of the auxiliary door 400 are preferably constituted by the front panel 271.

To this end, the front panel 471 is preferably configured to be larger than the plurality of thermal insulation panels 473 and 476. That is, the front panel 471 preferably not only covers the entire area of the thermal insulation panels but also extends outward beyond the boundary of the entire area.

The plurality of thermal insulation panels 473 and 476 may be fitted on the inner surface of the opening in the inner frame 410, that is, on the inner surface of the opening 411, and the rear surface of the second thermal insulation panel 476 may be supported by the door liner 480.

A rectangular spacer rod 472 may be interposed between the front panel 471 and the first thermal insulation panel 473 so as to maintain a predetermined spacing therebetween.

A handle may be coupled to the left side of the inner frame 410 and the door liner 480, which are coupled to each other.

For the purpose of coupling between the inner frame 410 and the handle 440, the left side surface of the inner frame 410 may be provided with a pair of catch ribs 412, which engage with a pair of fitting ribs 442 vertically formed on the right side surface of the handle 440.

The pair of catch ribs 412 may be configured in such a manner as to laterally project from the left side surface of the inner frame 410 and then be respectively bent forward and rearward.

In order to match the catch ribs 412, the pair of fitting ribs 442 may be configured to be laterally projected from the right side surface of the handle 440 and then be respectively bent forward and rearward.

As a consequence of coupling between the inner frame 410 and the door liner 480, a predetermined space 485 is defined in the marginal portion of the auxiliary door 400. The space 485 may also be defined by coupling the cap decorations to the inner frame 41 and the door liner 480. In other words, the space 485 is defined in the upper and lower marginal portions and both lateral side portions of the auxiliary door 400. The space may be referred to as a filling space that is filled with a thermal insulation material.

Accordingly, the marginal portion of the auxiliary door 400 may be thermally insulated by the thermal insulation material, and the central portion of the auxiliary door 400 may be thermally insulated by the panel assembly 470.

The region of the front panel 471 that is positioned outside the thermal insulation panel in the radial direction may be in close contact with the inner frame 410. The region of the front panel 471 may also be in close contact with the cap decorations. The latter is the case where the upper and lower portions of the inner frame are constituted by separate cap decorations.

After the handle 440 is coupled to the inner frame 410, the cap decorations may be coupled to the inner frame 410 if necessary. Subsequently, the panel assembly 470 may come into close contact with the inner frame 410 from the front. At this point, the inner frame 410 and the panel assembly 470 may be temporarily coupled to each other by disposing a piece of transparent adhesive tape or a transparent adhesive therebetween. Specifically, the transparent adhesive tape may be disposed between the inner frame 410 and the rear surface of the marginal region of the front panel 471 (i.e. the marginal region positioned outside the thermal insulation panel in the radial direction).

After the panel assembly 470 is temporarily coupled to the inner frame 410, the door liner 480 may be coupled to the inner frame 410 from the rear position of the inner frame 410. Thereafter, the space 485 is filled with a foamed material, with the result that the panel assembly 470 is closely coupled to the door frame 405.

As described above, the main door or the auxiliary door according to the embodiments of the present invention may be selectively converted into a see-through door. Specifically, upon the input of specific command from a user, the main door or the auxiliary door may be converted into a see-through door.

The conversion into a see-through door may be implemented by activating the lighting device 600 disposed in the storage compartment. Upon activation of the lighting device 600 in the storage compartment, the storage compartment becomes bright. Accordingly, the light in the storage compartment is transmitted to the outside through the door, whereby the interior of the storage compartment becomes visible through the door from the outside.

The kind of user input for conversion into a see-through door may vary. Furthermore, the kind of sensor for detecting such user input may also vary.

The refrigerator according to the embodiment of the present invention may include a sensor for detecting user input for the conversion to a see-through door.

Specifically, the sensor 500 is preferably a sensor for detecting acoustic waves propagating through a medium. The user input may be detected by identifying acoustic waves, detected by the sensor, as a certain pattern of acoustic waves.

This indicates that the sensor 500 can detect the occurrence of a vibration even when the position at which the acoustic waves are generated is spaced apart from the position at which the acoustic waves are detected, as long as the medium is continuous. In other words, considering the entire surface area of the refrigerator door, this indicates that the distance between the acoustic wave generation position and the acoustic wave detecting position can be maximally increased as long as the continuity of the medium of the refrigerator door is maintained.

The acoustic wave generating position may be considered to be the position at which the user input for conversion into a see-through door is applied, and the acoustic wave detecting position may be considered to be the position at which the user input is detected by the sensor. Therefore, by adoption of the sensor for detecting acoustic waves, the position and manner in which the user input is applied may be variously changed regardless of what the posture a user assumes or whether a user is holding objects with both hands.

According to this embodiment, by virtue of the adoption of the acoustic wave sensor, a user can apply input to the front surface of the door at any position. Furthermore, the sensor may be located at any position on the door without limitation. In this regard, considering the characteristics of acoustic waves, the same continuous medium is preferably provided between the position at which a specific vibration input is applied and the position at which the vibration input is detected. In other words, it is preferable that acoustic waves, which are generated by user knock input applied at a certain position, be transmitted to a predetermined position through a consistent medium for detection.

The sensor 500 may include a microphone for measuring acoustic waves substantially transmitted through a medium. Although the medium of the front panel is different from air, acoustic waves may be efficiently transmitted to a point very far away because of the inherent property of acoustic waves.

For example, when a person puts his/her ear to a train rail, the person can perceive that there is a running train at a location very far away. This indicates that acoustic waves are efficiently transmitted a long distance through the train rail, which serves as a medium.

Of course, vibrations of the medium itself rather than acoustic waves generated by a user knock input may be generated.

However, vibrations of a medium are transmitted through the surface of the medium. That is, the vibrations may be referred to as transverse waves. Accordingly, as the distance between the input position and the detection position in the same medium is increased, the damping width is increased. In contrast, the damping width of acoustic waves is very small. Accordingly, considering the size of a refrigerator, it is considered more efficient to detect acoustic waves transmitted through the inside of the medium rather than vibrations transmitted through the surface of the medium.

The sensor for detecting acoustic waves is intended to detect the transmission of acoustic waves through the front panel itself. Accordingly, it is possible to obviate the mounting of an additional device, such as a touch panel, to the front panel. This indicates that it is possible to eliminate disadvantages, such as increased cost and complexity and decreased durability, attributable to the addition of a touch panel. Furthermore, this indicates that the knock input area can be substantially extended over the entire area of the front panel.

As described above, the front panel according to this embodiment is preferably constituted as a medium through which a acoustic wave caused by user input is transmitted. In other words, it is preferable that user input be applied to the front panel, which is exposed from the front face of the door, and that the acoustic wave transmitted through the front panel be detected by the sensor. The sensor may include a sensor device, particularly a microphone, for detecting the transmission of acoustic waves through a medium.

When a microphone is used as the sensor device, the acoustic waves transmitted through the front panel are transmitted to the microphone through the air, which serves as another medium. Accordingly, it may be critical to shield the acoustic wave transmitting space, located between the front panel and the microphone, from the outside. This is because external noise may be input to the microphone if the space is not shielded. Accordingly, it is critical to keep the microphone module, including the microphone, in close contact with the front panel and to maintain such close contact, as will be described later. Furthermore, it is also critical to continuously apply a force to a support member for supporting the microphone in the contact direction. That is, the support member may also be caused to closely contact the front panel.

Accordingly, the input position can be spaced apart from the detecting position by virtue of transmission through the front panel even if no additional touch panel is provided. Particularly, the damping of acoustic waves transmitted through a medium is comparatively very small, whereby the spacing distance can be more efficiently increased.

In the embodiments of the present invention, it is preferable that the knock input from a user be applied to the center area of the door, which is convertible into a see-thorough area, and that the sensor for detecting the user input be provided at the marginal area of the door, which is not convertible into a see-through area. Of course, the point to which the knock input is applied and the point at which the vibration is detected are preferably positioned on a single front panel constituted by a continuous medium. Discontinuity of the medium means that variation in the detection value may be higher depending on the position at which knock input is generated even when the same vibration input is applied. Hence, the detection accuracy is inevitably decreased.

Furthermore, this indicates that the danger of determining that input applied to a medium other than the front panel is a normal knock input can be reduced. In other words, this indicates that a malfunction whereby an impact applied not to the front panel but to another portion of a refrigerator, is recognized as normal knock input can be remarkably decreased. This is because the cabinet of a refrigerator is typically constituted by a medium different from that of the front panel.

For this reason, it is strongly preferable that the knock input application point and the knock input detection point be positioned on a single front panel as in the embodiments of the present invention.

The impact applied to other portions of the refrigerator may be the vibration of the refrigerator itself. Any portion of the refrigerator may vibrate due to various causes, such as the vibrations caused by driving of the refrigeration cycle or vibrations caused by external force applied to the refrigerator. At this time, the vibrations of the refrigerator may be transmitted through the front panel, thus influencing the sensor. In other words, when an intensive vibration is generated, the front panel itself inevitably vibrates, even if the two media are different from each other. Accordingly, there may be a circumstance whereby, when vibrations of the medium itself are detected, the vibrations of the refrigerator itself are falsely recognized as normal knock input.

However, it is known that the damping width of acoustic waves through different, i.e. discontinuous, media is increased. Accordingly, acoustic waves generated by an impact applied not to the front panel but to another portion of the refrigerator may be sufficiently dampened while being transmitted through the different media. Therefore, when the knock input is recognized by detecting acoustic waves, the malfunctions caused by impacts or vibrations applied to portions other than the front panel can be remarkably reduced. Specifically, in the case where the microphone for detecting acoustic waves is used, since the microphone is less sensitive to the vibration of the refrigerator itself, errors whereby the vibration of the refrigerator itself is recognized as normal knock input can be remarkably reduced.

Figure 9:
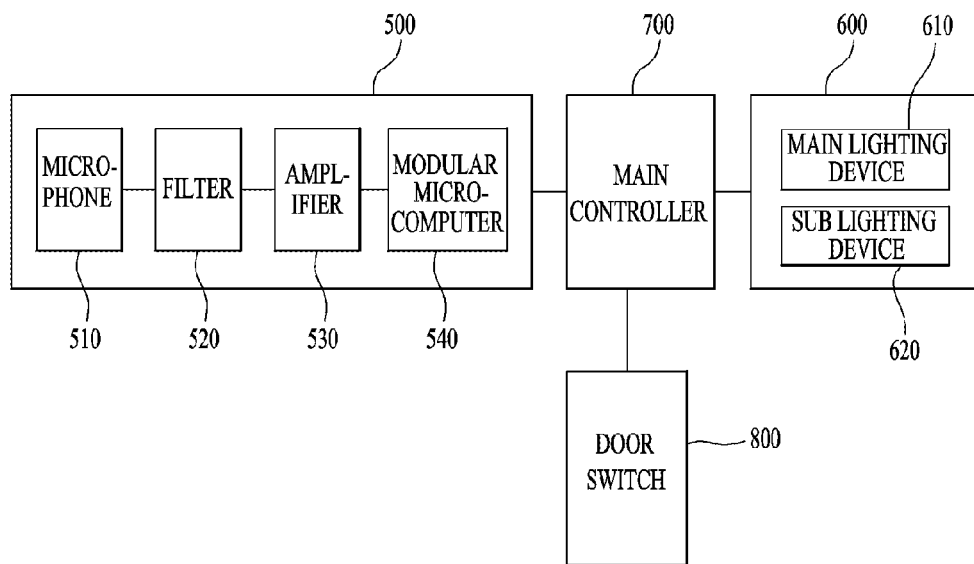
FIG. 9 is a block diagram showing a control construction according to an embodiment of the present invention.

As shown in FIG. 9, the refrigerator according to this embodiment of the present invention may include the sensor 500 for detecting user input for conversion into the see-through door, a main controller 700 and the lighting device 600.

The sensor 500 may be provided on the front surface of the door, for example, the front panel 271 or 471 of the auxiliary door 200 or 400, so as to detect the knock input by a user. In other words, the sensor 500 may be provided on the front panel so as to detect the knock input that is applied thereto by a user.

When the normal input for conversion into a see-through door is correctly applied by a user, the main controller 700 activates the lighting device 600. As a result, the interior of the storage compartment is brightened, whereby the door is converted into a see-through door.

Specifically, the sensor 500 may include a second device for detecting input for conversion into the see-through door. In particular, the sensor 500 may include a microphone 510 as a sensor device for detecting acoustic waves. In other words, the sensor 500 preferably includes the microphone 510, which is configured to detect acoustic waves transmitted through the inside of a medium rather than detecting the vibration of the medium itself.

The microphone 510 may detect not only acoustic waves caused by a user's knock signal but also acoustic waves caused by external noise. The latter kind of acoustic wave or vibration may be referred to simply as "noise". Accordingly, it is necessary to mechanically prevent such noise from being input to the microphone 510.

To this end, the microphone 510 is preferably in close contact with the medium. In particular, the microphone 510 is preferably in close contact with the front panel 271 or 471. Accordingly, a mounting member or support member for causing the microphone 510 to closely contact the front panel is required. The concrete embodiments of the member will be described later.

The main controller 700 may be considered a main microcomputer adapted to perform general control of a refrigerator, that is, a controller for controlling the driving of a compressor or various fans.

The refrigerator is typically provided with a door switch 800. Therefore, it is possible to determine whether or not the refrigerator door is opened based on the door switch 800. When the door is opened, the door switch 500 is switched to the ON state so as to activate the lighting device 600 in the storage compartment. When the door is closed, the door switch is switched to the OFF state, whereby the lighting device 600 in the storage compartment is deactivated. The ON state and OFF state of the door switch may be reversed with each other. The operation of the door switch 800 and the lighting device 600 may be implemented independently from the controller 700. Of course, it will also be possible for the controller 700 to determine whether the door is open or closed by virtue of the door switch 800, to thus control the lighting device 600 depending on the determination.

In this embodiment, the process of controlling the door switch 800, the main controller 700 and the lighting device 600 may be performed in two ways. The lighting device 600 may include a main lighting device 610 and an auxiliary lighting device 620.

An operational example in which the main door itself is converted into a see-through door is first described.

For the conversion into a see-through door, the main controller 700 may operate the lighting device 600, in particular, the main lighting device 610. The conversion into a see-through door is preferably implemented under the assumption that the main door is in a closed state. Accordingly, in response to the determination of input of the normal knock signal, the main controller 700 preferably controls the main lighting device 610 to operate even if the door switch 800 is in an ON state (the door is closed). The main controller 700 may control the operation of the main lighting device 610 in accordance with the algorithm for conversion into a see-through door as long as the door is not opened. For example, the main controller 700 may control the main lighting device such that the brightness of the lighting device is gradually increased. Furthermore, it is possible to control the main lighting device such that the main lighting device stops after the main lighting device has been operating for a predetermined period of time. In other words, it is possible to control the main lighting device so that it turns off after a predetermined period of time has elapsed.

In the case where the door is opened while conversion into a see-through door is maintained, the algorithm may be overridden by the normal control algorithm for the main lighting device 610. In other words, control may be performed such that the main lighting device 610 is always operated while the main door is opened. Of course, it may also be controlled such that an alarm is generated and the main lighting device 610 is turned off when the door has remained in an open state for an excessively long period of time.

An operational example in which not the main door but the auxiliary door is converted into a see-through door will now be described. In this example, the auxiliary lighting device 620 for making the interior of the auxiliary storage compartment bright is preferably provided, in addition to the main lighting device 610 for making the storage compartment bright.

Although not shown in the drawings, the auxiliary lighting device 620 may include an LED module mounted on one or both inner sides of the opening 115 or 215 of the main door 100 to illuminate the auxiliary storage compartment. The LED module may be constituted by an elongated circuit board and a plurality of LEDs arranged on the circuit board at predetermined intervals.

The LED module is preferably mounted in a groove formed in both inner sides of the opening in the main door 100 and is preferably covered by a transparent cover so as to protect the LED module and prevent the entry of moisture or pollutants.

In response to the determination of input of the normal knock signal, the main controller 700 may activate the auxiliary lighting device 620 to convert the auxiliary door into a see-through door. At this time, the auxiliary lighting device 620 is preferably controlled to be operated for a predetermined period of time. If a predetermined time has not elapsed when the auxiliary door is opened by a user, the auxiliary lighting device 620 may be controlled to be continuously activated.

If a predetermined time has not elapsed, a user cannot open the main door. In this case, there is no need to maintain the conversion of the auxiliary door into a see-through door. Accordingly, when it is determined that the main door has been opened through the door switch while the auxiliary door is in the state of having been converted into a see-through door, the operation of the auxiliary lighting device 620 is preferably controlled to be stopped.

Consequently, unnecessary operation of the lighting device 600 may be reduced through control of the relationship between the main controller 700, the lighting device 600 and the door switch 800.

The main controller 700 may determine whether a normal signal for conversion into a see-through door has been input, based on the signal input through the sensor 500. Specifically, the main controller 700 may directly determine whether the input signal is a normal signal or noise. In this case, an overload may be applied to the main controller 700, and the effect of noise inherent in the signal line itself may be further increased owing to the distance between the sensor 500 and the main controller 700.

As described above, the sensor 500 is preferably provided on the front panel 271 or 471. In most cases, the main controller 700 is provided on the cabinet 10 rather than the door. Hence, the distance between the sensor 500 and the main controller 700 is increased, which means that the length of the signal line is increased. This indicates that the normal signal for conversion into a see-through door may be contaminated by the noise inherent in the signal line and before being input to the main controller 700. Therefore, the recognition rate of the signal for conversion into a see-through door is inevitably deteriorated. In particular, in the case where the sensor includes a microphone as a sensor device, it is common for the signal output through the microphone to be on the order of mV whereas the signal input to the main controller 700 must be on the order of V Hence, it is undesirable for the main controller 700 to determine whether the signal is a normal signal for conversion into a see-through door because of the physical difference in magnitude of the signals.

In particular, refrigerators are electronic appliances that consume high voltage and high current. Accordingly, the amount of electrical noises generated by refrigerators is relatively high. This means that the signal on the order of mV, output through the microphone, is more easily affected by such electrical noise.

In order to solve this problem, according to this embodiment, the sensor 500 for detecting input for conversion into a see-through door is preferably modularized. In this regard, the modularized sensor may be referred to as a sensor module.

The sensor module or knock sensor module, which is denoted by the numeral "500", may include the microphone 510, as the sensor device, and a modular microcomputer 540. As described above, the microphone 510 is a sensor device for detecting a knock on signal, and the modular microcomputer 540 serves to determine whether the signal detected by the microphone 510 is a knock on signal.

For example, the modular microcomputer 540 determines whether the input signal is a normal knock on signal. When the input signal is determined to be a normal knock on signal, the modular microcomputer 540 may send to the main controller 700 a signal indicating that normal knock on input has been applied. When the input signal is determined not to be a normal knock on signal, the modular microcomputer 540 may not send the signal. For example, when the input signal is determined to be a normal knock on signal by the modular microcomputer 540, the modular microcomputer 540 may send a signal of 5V to the main controller 700. In the other case, the modular microcomputer 540 may send a signal of 0V to the main controller 700. The latter is considered to be the case where no signal is sent to the main controller 700.

Since the main controller 700 receives a signal that indicates only that normal knock on signal has been input, the main controller 700 does not perform any additional determination. Consequently, it is possible to minimize the effect of noise inherent in the signal line between the main controller 700 and the modular microcomputer 540. In the same way as above, the modular microcomputer 540 may determine whether a normal knock on signal has been input based on a signal which is input through the modularized microphone and which contains minimal noise. Accordingly, an accurate recognition rate may be realized.

The knock sensor module or sensor module 500 may include a filter 520. The filter 520 serves to eliminate noise from the signal received from the microphone 510. Specifically, the filter 520 may be a noise filter. The filtered signals are preferably amplified through an amplifier. Therefore, the sensor module 500 preferably further include an amplifier 530 for amplifying the filtered signal and transmitting the amplified signal to the modular microcomputer 540. Specifically, the amplifier 530 may be an operational amplifier.

The sensor module 500 preferably includes the filter 520, the amplifier 530 and the modular microcomputer 540 mounted on a single PCB, and the microphone 510 preferably extends from the PCB by means of a signal line. The structure by which the microphone 510 is mounted or secured will be described later.

Hereinafter, the microphone or microphone module as the sensor device is described in detail with reference to FIG. 10.

Figure 10:
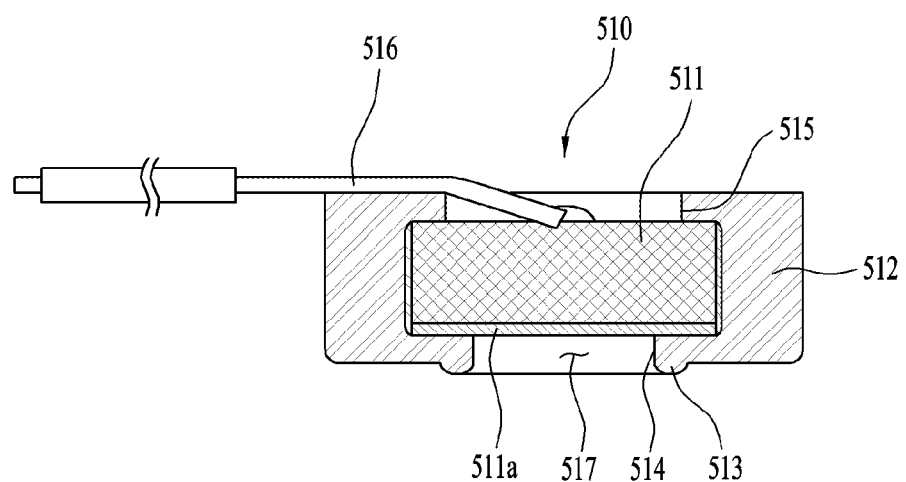
FIG. 10 is a cross-sectional view of a microphone module (sensor device module), which is applicable to the embodiment of the present invention.

As shown in FIG. 10, a microphone 511 is preferably embodied as the microphone module 510. In other words, the microphone 511 for directly detecting acoustic waves is preferably provided in the state of being received in a receptor 512. Accordingly, the microphone 511 and the microphone receptor 512 may be collectively referred to as the microphone 510 or the microphone module 510.

The microphone 511 may be configured to have a circular plate having a predetermined thickness. The microphone 511 is received in the microphone receptor 512, and the movement of the microphone 511 is thus restricted by the internal structure of the microphone receptor 512. In other words, the microphone 511 is preferably supported such that the microphone 511 floats in the microphone receptor 512.

The microphone receptor 512 is preferably made of a rubber material. Basically, the microphone 511 is closely fitted in the microphone receptor 512. The microphone receptor 512 may be provided at the top and bottom thereof with openings 514 and 515, each of which may have a circular shape.

One side of the microphone 511 is considered to function as an acoustic wave receiver 511*a* for receiving acoustic waves. The acoustic wave receiver 511*a* may be oriented to face one of the openings in the microphone receptor 511. For the convenience of illustration, the acoustic wave receiver 511*a* is illustrated as facing the lower opening 514.

A signal line 516 is connected to the other side of the microphone 511. The signal line 516 may be connected to the PCB of the knock sensor module through the opening 515, as described above.

A predetermined space is preferably defined between the lower opening 514 and the acoustic wave receiver 511*a*. The predetermined space is preferably sealed. To this end, the predetermined space is preferably sealed by causing the lower opening 514 to closely contact the medium, i.e. the front panel 271 or 471.

The predetermined space 517 may also be isolated from the upper opening 515 by the close contact between the microphone 511 and the microphone receptor 512.

In order to prevent the hermetical space from being damaged by the imbalance, a protrusion 513 is preferably provided along the periphery of the lower opening 514. Specifically, even if the distribution of force that acts on the microphone receptor 512 to cause the microphone receptor to closely contact the medium subsequently becomes imbalanced, the hermetical space is effectively maintained by the elastic deformation of the protrusion 513.

Accordingly, one side of the hermetical space is closed by the medium. Consequently, the air in the hermetical space is vibrated by acoustic waves transmitted through the inside of the medium, and acoustic waves generated by the vibration may be input to the microphone 511.

By virtue of the hermetical sealing, it is possible to block or suppress the infiltration of external noise or vibrations into the predetermined space. Therefore, the erroneous determination of knock on input or malfunctions attributable to external noise may be remarkably reduced, and the recognition rate of knock on input may be improved. In other words, when a knock on input is applied, the accuracy of the determination of whether a knock on input was applied may be greatly improved.

Hereinafter, the structure for mounting the sensor for detecting input for conversion into a see-through door will be described in detail. In particular, the structure for mounting the sensor will be described in detail under the assumption that the sensor is embodied as the microphone module 510 shown in FIG. 10. For the convenience of illustration, the signal line 516 is not shown in FIG. 11.

Figure 14:
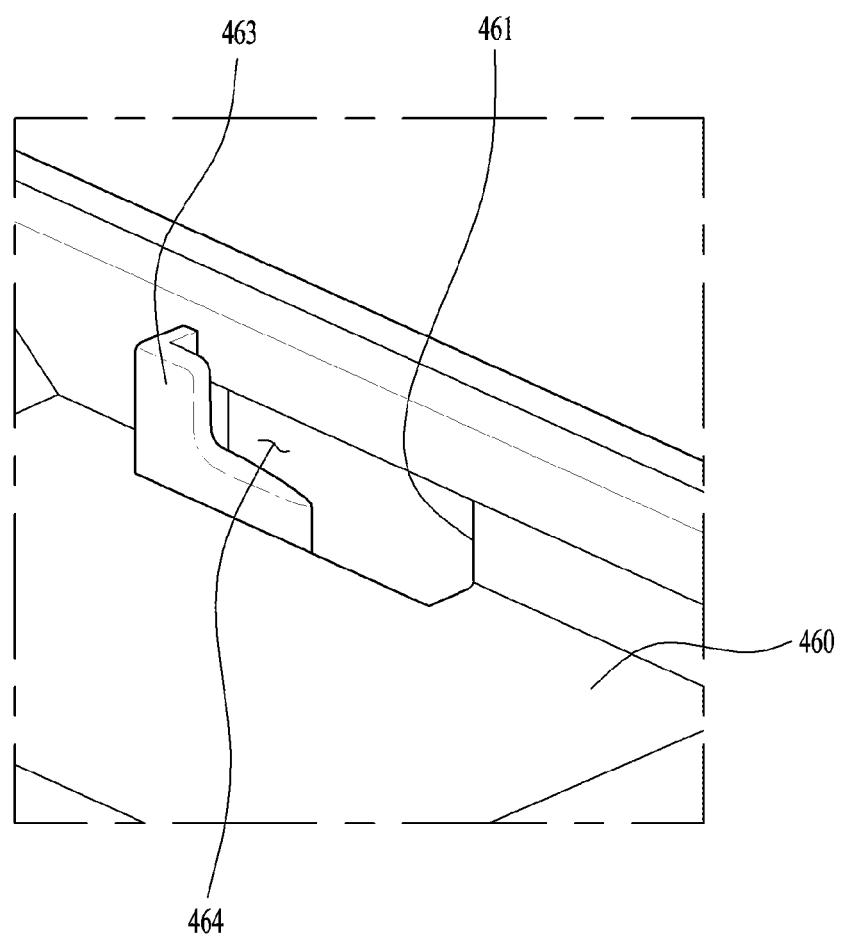
FIG. 14 is an enlarged view showing a cap decoration having a through hole formed therein in another embodiment of the structure for mounting the sensor device module (microphone module) of the door (auxiliary door) according to the second embodiment.

An example of the structure for mounting the microphone module 510 is first described with reference to FIG. 14.

According to this embodiment, the front panel 271 may constitute the central area of the door or the auxiliary door, and the door frame 205 may constitute the marginal area of the door or auxiliary door.

Figure 11:
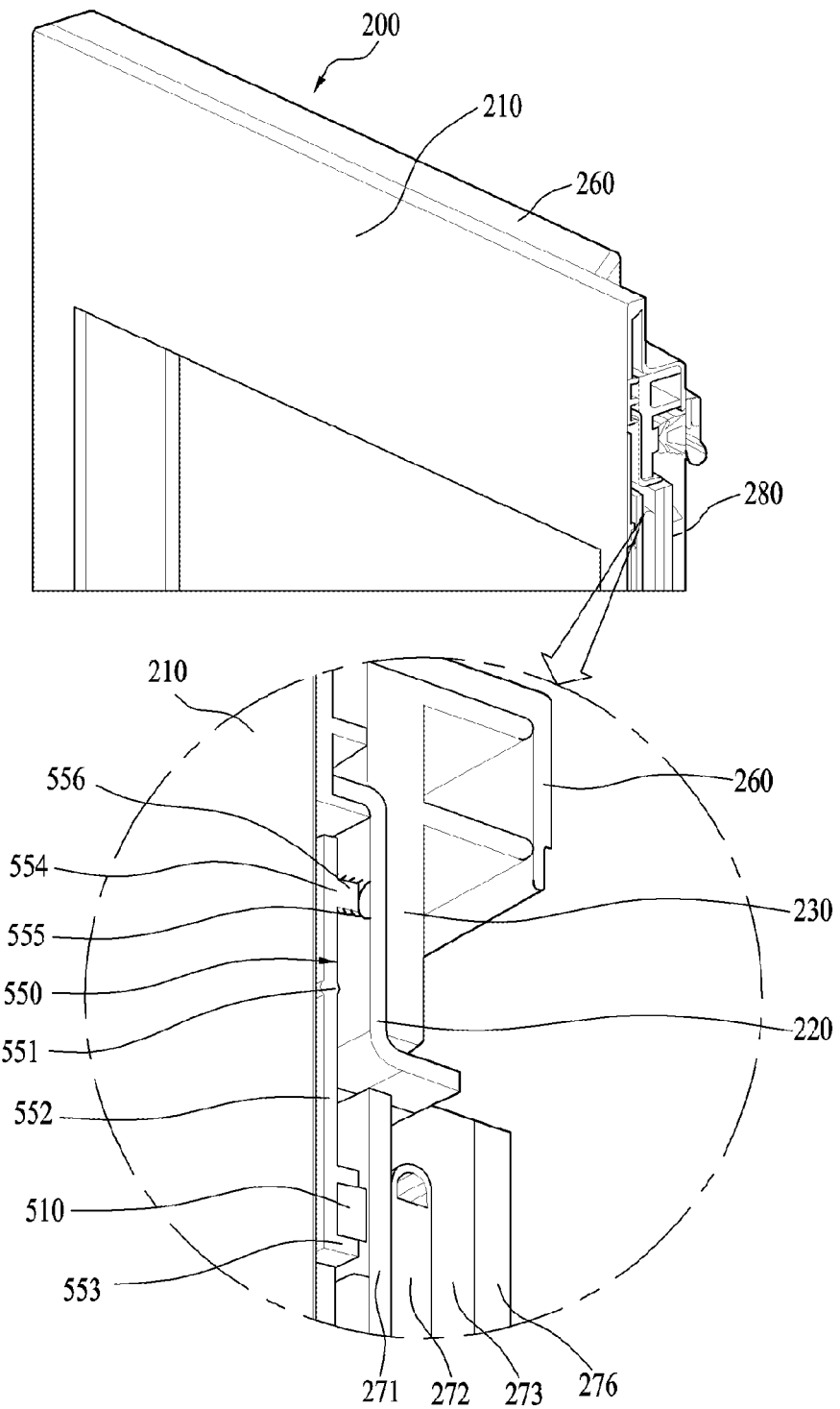
FIG. 11 is a perspective view showing a structure for mounting a sensor device module (microphone module) in the door (the auxiliary door) according to the first embodiment, which is partially cut away.

Specifically, FIG. 11 illustrates a partially broken away perspective view and an enlarged view of the structure for mounting the microphone module 510 on the auxiliary door. For the convenience of illustration, the door liner 280 is omitted in FIG. 11.

According to this embodiment, the microphone module 510 is preferably mounted on the front panel 271 in a close-contact manner.

As shown in the drawings, the marginal area of the front panel 271 is covered by the door frame 205, in particular, the outer door 210. The microphone module 510 is disposed between the outer door 210 and the front panel 271. The microphone module 510 is preferably in close contact with the front panel 271.

Specifically, in order to mount the microphone module 510 to the front panel 271 in close-contact manner, a support member 550 is preferably provided. The support member 550 may be disposed between the outer door 210 and the front panel 271. Furthermore, the support member 550 may be disposed between the outer door 210 and the door decoration 220.

Accordingly, both the microphone module 510 and the support member 550 may be positioned outside the opening 211 in the radial direction for the conversion into a see-through door. Therefore, the microphone module 510 and the support member 550 may not be visibly exposed to the front of the door even upon conversion into a see-through door. In addition, since the microphone module 510 and the support member 550 are prevented from being visibly exposed to the outside through the see-through door, the design of the door becomes elegant and neat.

Specifically, the support member 550 preferably includes an elastic element 555. The elastic element 555 is preferably configured to exert an elastic force in the direction of causing close contact of the microphone module 510. Therefore, it is preferable that the support member 555 always be biased toward the microphone module 510.

The support member 550 may include a fulcrum 551, a first extension 552 extending in one direction from the fulcrum 551, and a second extension 554 extending in the opposite direction from the fulcrum 551. The fulcrum 551 may be interposed between the outer door 210 and the door decoration 220.

The first extension 552 may be provided with a holder 553. The holder 553 may be positioned at the end of the first extension 552. The holder 553 may be provided with the microphone module 510 held therein.

The elastic element 555 may be disposed between the second extension 554 and the door decoration 220 so as to exert an elastic force on the second extension 554, thus biasing the second extension 554 forward. The elastic force is converted into an elastic force that pushes the first extension 553 rearward like a seesaw, which is in turn converted through the holder 553 into a force that causes the microphone module 510 to closely contact the front panel 271. Consequently, the elastic force from the elastic element is continuously applied to the microphone module 510 so as to cause the microphone module 510 to closely contact the front panel 271.

If the auxiliary door 200 is configured so as not to include the door decoration 220 and the inner frame 230, the support member 550 will be disposed between the outer door 210 and the door liner 280. Accordingly, the support member 550 may be positioned outside the opening in the door frame 205 in the radial direction.

The elastic element 550 may be a coil spring. The second extension 554 may be provided on the rear surface thereof with a protrusion 556 for supporting the elastic element 555.

Specifically, the elastic element 555 may be compressed a predetermined amount at the time of assembly so as to exert an elastic force that pushes the second extension 554.

Since the elastic element 550 biases the second extension 554, the first extension 552, which is positioned at the opposite side with respect to the fulcrum 551, biasedly pushes the microphone module 510, whereby the microphone module 510 is caused to closely contact the front panel 271. In other words, it is possible to continuously maintain the state in which the microphone module 510 is in close contact with the front surface of the front panel 271.

Therefore, the microphone module 510 can efficiently recognize that a user is tapping the front panel 271.

Hereinafter, another embodiment of the structure for mounting the microphone module 510 will be described with reference to FIGS. 12 and 13.

As in the above embodiment, the microphone module 510 is preferably mounted so as to closely contact the front panel. In addition, the microphone module 510 is mounted on the door frame such that the microphone module 510 does not interfere with the see-through door.

The structure for mounting the microphone module according to this embodiment may be applied to the door shown in FIG. 6. In other words, this structure may be applied to the case where the front panel 471 defines the entire appearance of the front surface of the door.

Specifically, this structure may be applied to a door in which the thermal insulation panel is fitted in the opening and the rear marginal area of the front panel is in close contact with the door frame.

As described above, the door frame 405 may include the inner frame 410. The inner frame 410 may be integrally formed with cap decorations 460, or the cap decorations 460 may be respectively coupled to the upper and lower ends of the inner frame 410.

Figure 12:
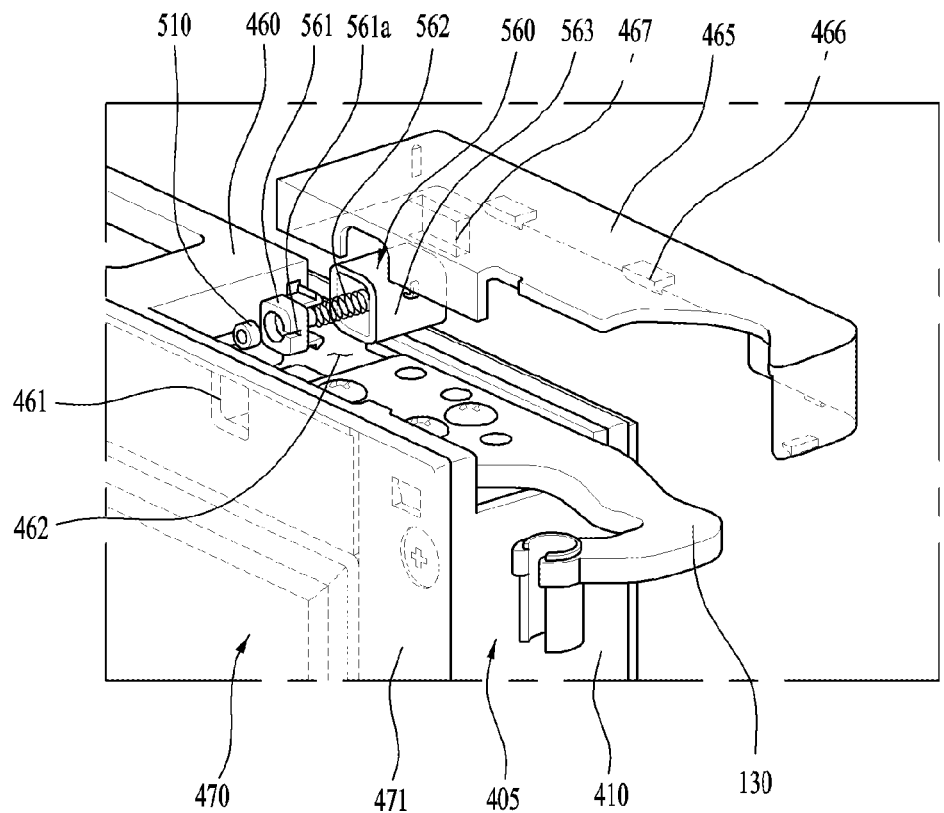
FIG. 12 is a fragmentary perspective view showing a structure for mounting a sensor device module (microphone module) in the door (auxiliary door) according to the second embodiment.
Figure 13:
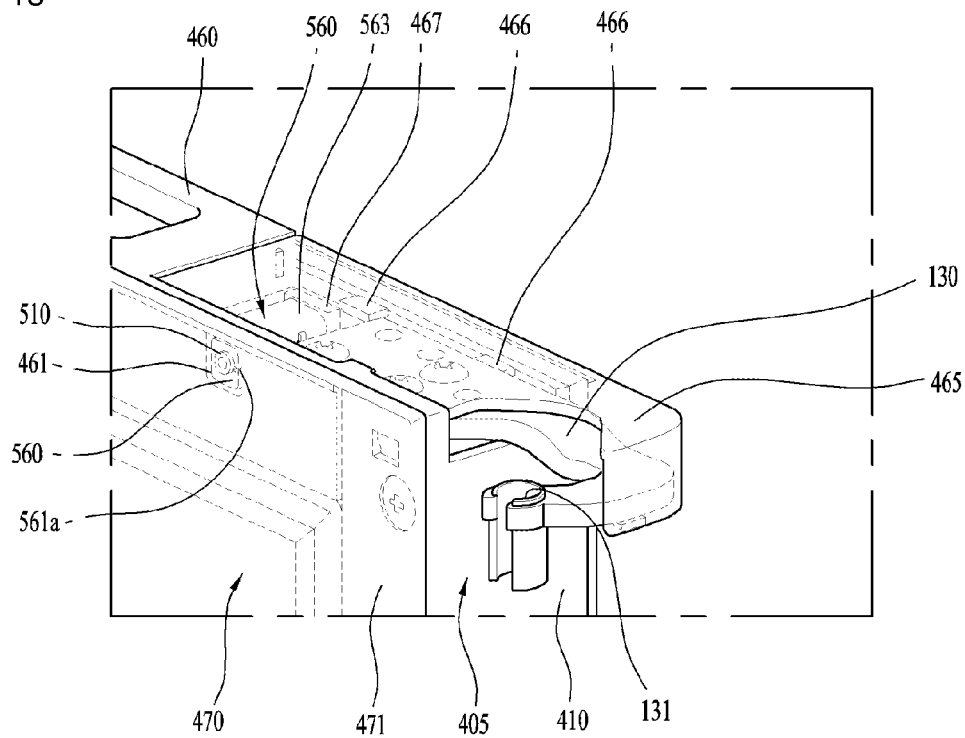
FIG. 13 is a perspective view showing the structure shown in FIG. 12.

Referring to FIGS. 12 and 13, the structure in which the microphone module 510 is mounted by means of the cap decorations 460 is shown.

More specifically, the cap decoration 460 may be provided at the front region thereof with a through hole 461 through which the microphone module 510 passes. The microphone module 510 may closely contact the front panel 471 through the through hole 461.

For the purpose of close contact of the microphone module 510, a support member 560 is provided. The cap decoration 460 may be preferably provided with a seat portion 462 in which the support member 560 is stably received.

The microphone module 510 is at least partially received in a holder 561. Accordingly, it is possible to cause the microphone module 510 to closely contact the front panel and to maintain that state by pushing out the holder 561 toward the front panel 471. Therefore, the support member 560 preferably includes an elastic element 562 for biasedly supporting the holder 561 and exerting an elastic force to the holder 561.

The holder 561 may be provided with a slit or slot 561a through which the signal line 516 shown in FIG. 11 is led out. Specifically, the microphone module 510 may be received in the holder 561, and the signal line 516, for transmitting the signal input to the microphone module 510 to the outside, may extend to the outside from the holder 561 through the slit or slot 561a.

When the holder itself is made of a flexible material, the signal line 516 may be fitted in the slit or slot 561a, and may thus be stably supported thereby.

The support member 560 may include a holder receptor 563 for receiving the holder 561. The elastic element 562 may be disposed between the holder 561 and the holder receptor 563. Therefore, the holder 561 is always biased forward with respect to the holder receptor 563.

The holder receptor 563 may be seated in the seat portion 462 such that the holder receptor 563 is always pushed forward. Specifically, the support member 560 including the holder receptor 563 may be securely seated in place in the seat portion 462, and, as such, a force for supporting the support member 560 forward may be applied to the support member 560 by itself.

To this end, a cover may be provided so as to cover the seat portion 462. The cover 465 may be a hinge cover 465 for covering the auxiliary door hinge 130 mounted on the cap decoration 460. In other words, because the hinge cover 465 is coupled to the cap decoration 460, the support member 560 may be supported by the hinge cover 465 and may thus be pushed forward.

Specifically, the cover 465 may be coupled to the cap decoration 460 by means of hook elements 466. At this point, the cover 465 may be provided with a protrusion or rib 467 so as to push the support member 560 forward.

Accordingly, the protrusion or rib 467 may serve to push the whole support member 560 forward and to maintain the pushed state of the support member 560. In addition, the elastic element 562 biases the holder 561 forward. As a result, the microphone module 510 may be maintained in the state of being in close contact with the front panel 471. In this embodiment, the microphone module 510 may, of course, come into close contact with the rear surface of the front panel 471 through the through hole 461.

The shape of the through hole 461 is preferably configured to mate with the shape of the holder 561. Consequently, since it is possible to prevent the holder 561 from being displaced in the through hole 461, the tight contact force of the microphone module 510 can be efficiently maintained.

The PCB of the knock sensor module 500 may be mounted on the lower surface of the cover 465. In other words, the cap decoration 460 may be provided with a space required to mount the auxiliary door hinge 130 and the PCB. The signal line of the sensor or sensor module 500 may extend to the inside of the cabinet 10 or the main door through the through hole 131 and may be connected to the main controller 700.

Although the sensor module 500 may be mounted at any position on the marginal area of the door or the auxiliary door, the knock sensor module 500 will be preferably mounted on the upper cap decoration in order to satisfactorily dispose the signal line.

Figure 15:
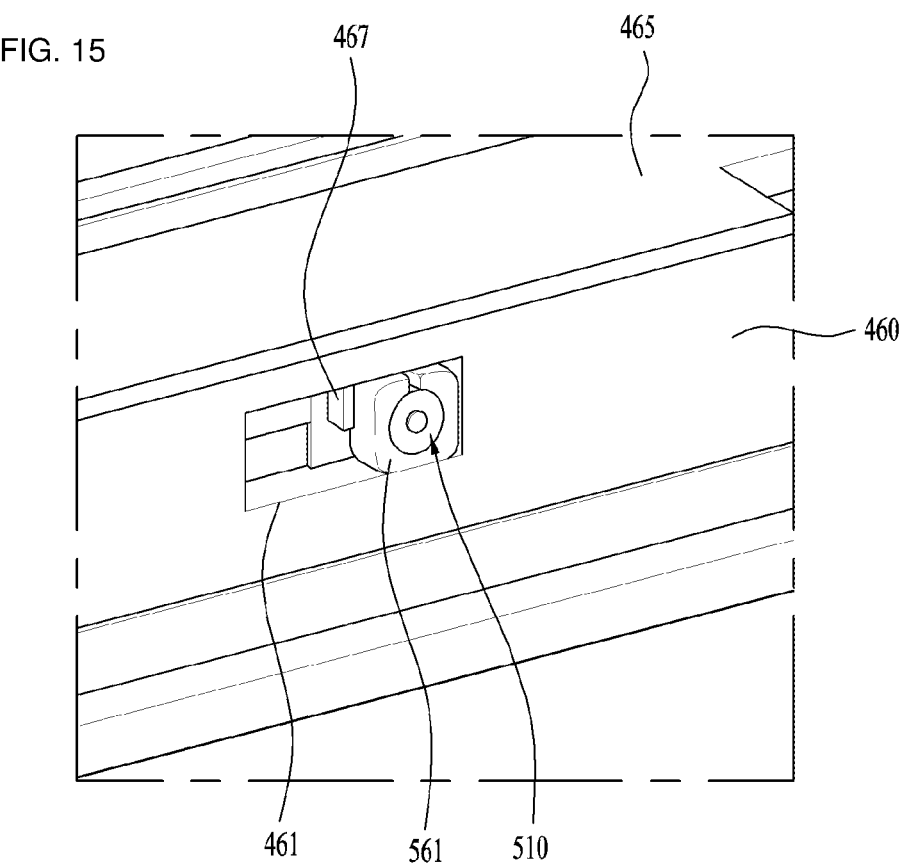
FIG. 15 is a fragmentary perspective view showing the microphone module mounted in the through hole shown in FIG. 14.
Figure 16:
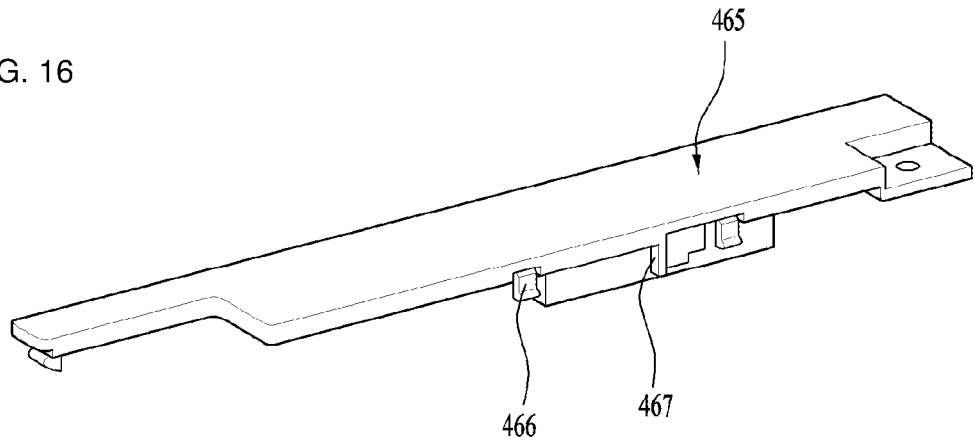
FIG. 16 is a perspective view of a cover coupled to the cap decoration shown in FIG. 14.

Hereinafter, a further embodiment of the structure for mounting the microphone module 510 will be described with reference to FIGS. 14 to 16.

As in the above embodiments, this embodiment also suggests the structure for mounting the microphone module 510 using the door frame, in particular, the cap decoration 460.

The cap decoration 460 may include a through hole 461 formed therein. The microphone module 510 may pass through the through hole 461 and may closely contact the rear surface of the front panel 471.

The microphone module 510 is received in the holder 561, which is configured to be identical or similar to that in the above embodiments. The holder 561 may constantly push the microphone module 510 toward the front panel, thus constantly causing the microphone module 510 to closely contact the front panel.

Since the holder 561 may also be made of a flexible material, the holder 561 may be flexibly restored toward the front panel in the state of being compressed.

Figure 18:
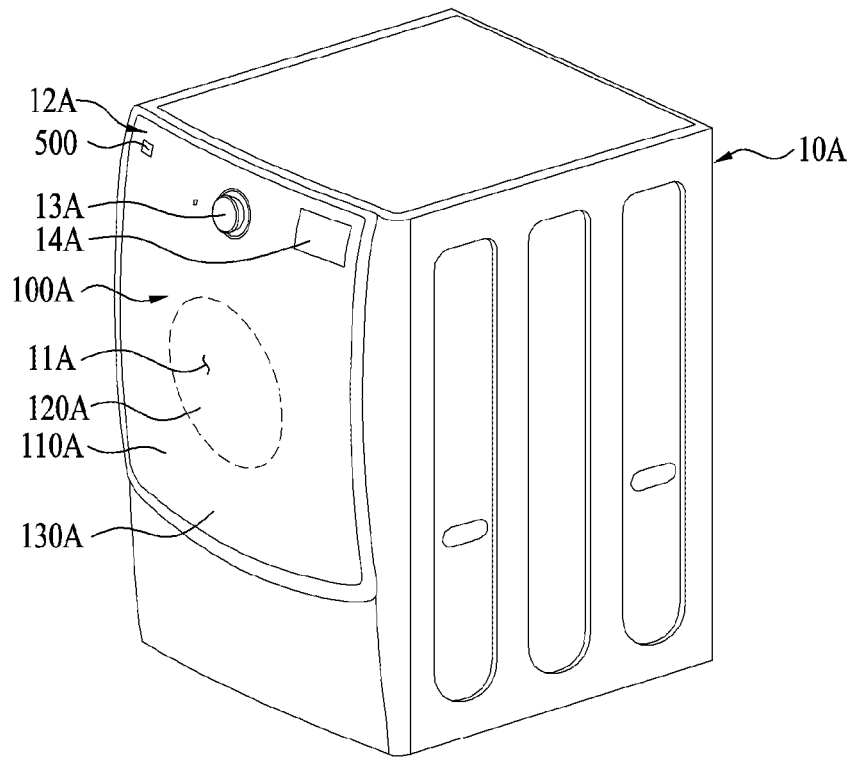
FIG. 18 is a perspective view showing a home appliance (laundry treatment apparatus) according to a third embodiment of the present invention.

To this end, a holder mount 463 may be provided in the rear of the through hole 461. The holder 561 may be pushed into and mounted in the holder mount 463 while containing the microphone module 510 therein. At this point, the through hole 461 may be configured to have a larger dimension than the holder 561 in the direction in which the holder is mounted. Specifically, when the holder 561 is pushed from the left side toward the right side to be mounted, as shown in FIG. 18, the through hole 461 preferably has a horizontal width greater than the horizontal width of the holder 561. Of course, the through hole 461 is preferably configured to have a vertical width corresponding to the vertical width of the holder 561 such that the upper and lower surfaces of the holder 561 are tightly fitted in the through hole 461.

Specifically, a predetermined space may be defined between the holder mount 463 and the through hole 461, and the holder 561 may be fitted in the predetermined space 464. More specifically, the width of the predetermined space in the forward and rearward direction is decreased as the holder 561 is inserted into the predetermined space. In other words, when the holder 561 is fully inserted into the space, the holder 561 is compressed forward and rearward. Accordingly, the holder 561 tends to flexibly return to its original state, thus generating a force that pushes the microphone module 510 forward.

The holder 561, which has been inserted, may be held in position. As described above, the cover 465 may be a cover for covering the cap decoration 460, or may be a hinge cover for covering the auxiliary door hinge 130. The cover 465 may also be coupled to the cap decoration 460 by means of the hook elements 466.

The cover 465 may be provided on the lower surface thereof with a protrusion or rib 467 that protrudes downward. When the cover 465 is coupled to the cap decoration 460, the protrusion or rib 467 pushes the holder 561. In other words, the protrusion or rib 467 pushes the holder 561 in the direction in which the holder 561 is inserted into the through hole 461.

Consequently, the holder 561 may always be maintained in the compressed state in the holder mount 463, and may be securely held regardless of vibrations or movement of the door. Therefore, the microphone module 510 may closely contact the front panel 471, and the close contact state may be continuously maintained.

Figure 17:
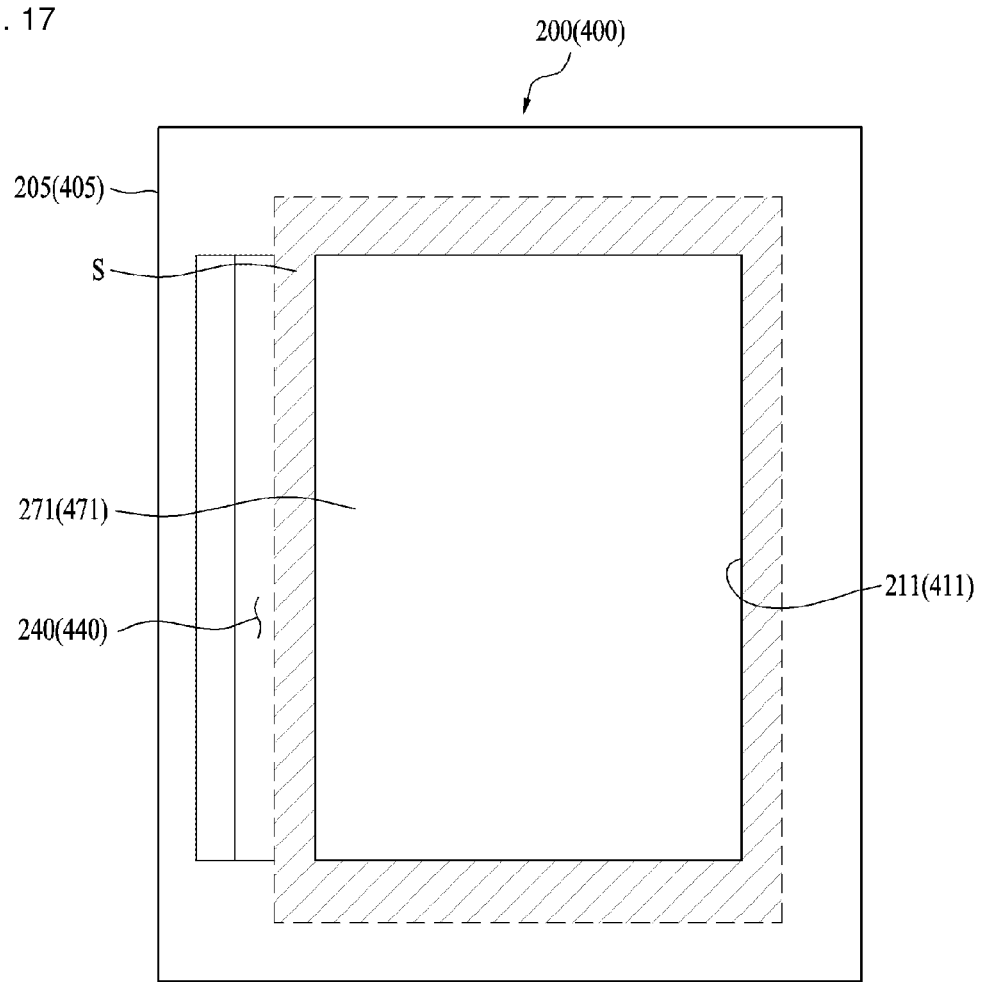
FIG. 17 is a conceptual diagram illustrating the position on the door (auxiliary door) on which the sensor device module (microphone module) is mounted and the area on the auxiliary door on which a user taps.

FIG. 17 is a conceptual diagram illustrating the position on the see-through door on which the microphone module is mounted and the area on the see-through door to which a user knock input is applied. In the case where the main door or the auxiliary door is constructed to be converted into a see-through door, the door has the opening 411 for defining the see-through door. In other words, the storage compartment or the auxiliary storage compartment becomes visible from the outside through the area radially inside the opening.

In the front surface of the door, the area inside the opening and at least part of the area outside the opening are defined by the front panel, as mentioned above. In the front surface of the outside type door, the area inside the opening and at least part of the area outside the opening are defined by the front panel, and the marginal area of the door is defined by the door frame, as mentioned above. In the inside type door, the entire front surface of the door is defined by the front panel.

Accordingly, the area to which a user knock input is applied may be basically the entire area defined by the front surface of the front panel. However, a user may unconsciously apply the knock input to the area that is converted into a see-through door. The area that is substantially converted into a see-through door is considered as the area radially inside the opening 211 or 411. Therefore, the entire rectangular area defined by the opening 211 or 411 may be defined as the area on which a user applies the knock input.

Since this knock input area is a see-through area, the microphone module is preferably mounted on an area other than the see-through area. Of course, the microphone module mounting area may be considered as an extension of the area of the front panel.

Accordingly, the mounting point of the microphone module is preferably positioned at the area radially outside the opening 211 or 411. As shown in FIG. 17, the microphone module is preferably mounted at a predetermined area S surrounding the opening 211 or 411.

Since the predetermined area S is not the see-through area, a user cannot easily see the microphone module from the front of the door even though the microphone module is in close contact with the front panel. Accordingly, the area to which the knock input can be applied may be efficiently expanded, and the distance between the knock input area and the microphone module mounting area can be sufficiently increased.

In order to sufficiently prevent the microphone module from being visibly exposed from the front surface of the door, the rear surface of the predetermined area S may be provided with a printed layer. In other words, the area of the rear surface of the front panel according to the predetermined area S may be formed with a printed layer. However, since the outside type door is constructed such that the predetermined area S is covered by the door frame or the outer door, the printed layer may be omitted.

As described above, the user input for conversion into a see-through door may be tapping on the front surface of the door, and the tapping may be detected by the sensor device, in particular, the microphone.

Therefore, many environmental factors that apply vibrations to the front surface of the door may be present. The front surface of the door may be vibrated by impacts caused by opening and closing of the door, intensive external noise, or the like. The input caused by these environmental factors may be determined to be a normal knock signal.

Accordingly, the sensor module enables a number of taps on the front surface of the door by a user to be determined as normal knock input. Specifically, the action whereby a user taps on the front surface of the door multiple times at a predetermined time intervals may be determined as normal knock input.

By way of example, the action whereby a user taps on the front surface of the door twice within a predetermined period of time may be determined as normal knock input. Considering a user's general knock pattern, it will be appreciated that the interval between the first knock and the second knock is about 600 ms or less. Since one second is 1000 ms, the action whereby the first knock and the second knock occur at an interval shorter than 1 second may be determined to be normal knock input.

Accordingly, it is possible to remarkably prevent abnormal input from being determined as a normal knock signal by setting the time interval.

The intensities of users' knocks may be different from each other. Although the difference between the intensities of users' knocks may be great, it will be appreciated that the difference between users' vibration patterns is very small. Accordingly, the difference between intensities of users' knocks may be compensated for by an algorithm, and normal knock input may be efficiently recognized based on the pattern of knock input and the time interval between knocks.

In other words, this indicates that the error whereby abnormal knock input is recognized as normal knock input may be remarkably reduced.

As described above, when the knock input is determined to be normal knock input, the controller 700 activates the lighting device 600. The controller 700 may control the lighting device to be turned off after the lapse of a predetermined period of time. When a user applies a second knock input before the predetermined period of time has elapsed, the controller 700 may control the lighting device 600 to be turned off. The knock input in this case may be the same as the knock on input. At this point, in order to distinguish such knock input from knock on input, only a single knock may be recognized as the knock off input.

It is, of course, preferable that the single knock input be recognized as the knock off input only when the single knock input occurs before the lapse of a predetermined period of time after the determination of knock on input As described above, the substantially entire front surface of the door may be used as the knock on input area by employing a sensor device such as the microphone. In other words, a wide area may be used as the knock on input area without having to provide the knock on input area with an additional sensor, such as a touch sensor or an electrostatic sensor. This means that it is possible to prevent an increase in costs attributable to the provision of a touch sensor, or an electrostatic sensor, or an additional panel including the sensor, and to improve durability. Furthermore, the door can be simply constructed.

In addition, this indicates that the knock on input can be easily applied to a wide area regardless of a user's posture or even if both hand are not free. Furthermore, the knock on input area may be defined to be substantially identical to the see-through area. Accordingly, it is possible to obviate elements that obstruct the transmission of light through the see-through area, that is, components such as a touch panel. As a result, a clearer see-through may be realized.

In the foregoing, embodiments of the refrigerator door and the refrigerator including the same have been described in detail as an example of a door and a home appliance according to an embodiment of the present invention.

In the following, in an example of a home appliance, an embodiment of a laundry treatment apparatus and a door that may be applied to the apparatus is described in detail. The contents as described in the above embodiments may be applied equally or similarly to the present embodiment, so long as they are not contradictory or exclusive.

FIG. 18 shows an example of a laundry treatment apparatus.

The laundry treatment apparatus includes a cabinet 10A. An object receiving chamber 11A is defined in the cabinet 10A. In a refrigerator, the object receiving chamber corresponds to a storage compartment, while in a laundry treatment apparatus, the object receiving chamber corresponds to a laundry storage compartment or drum.

The laundry treatment apparatus includes a door 100A. The user opens the door 100A so that the user can access the inside of the object receiving chamber 11A. Further, when the door 100A is closed, laundry treatment in the object receiving chamber 11A may be performed. That is, laundry treatment such as washing, drying, or refreshing may be performed in the object receiving chamber 11A.

A see-through region may also be formed in the door 100A. This see-through region may be referred to as see-through window 120A. The see-through window 120A may be configured so that visible light may pass through the door. Thus, the user may see the inside of the object receiving chamber 11A through the see-through window 120A from outside the door.

The door 100A may be provided on the front face of the laundry treatment apparatus. Further, a control panel 12A for the user interface may be provided on the front face of the laundry treatment apparatus.

The user may use the control panel 12A to perform an input operation associated with the laundry treatment. The user may also FIG. out the status information of the laundry treatment apparatus on the control panel. For example, when the laundry treatment apparatus is a washing machine, the user may input the laundry course, and may grasp the ongoing laundry information.

Specifically, the control panel 12A may include a course selection interface 13A. The user may select a desired course via the course selection interface 13A. This course selection interface may be provided in the form of a rotary knob.

Further, the control panel 12A may be provided with a display 14A. On the display 14A, various information such as course spending time, course remaining time, and information on the current course being performed may be displayed.

The control panel 12A may be provided separately from the door 100A. However, in recent years, a laundry treatment apparatus having a configuration in which a control panel 12A is integrated with the door 100A has been provided. In FIG. 18, a configuration in which the control panel 12A is integrally formed with the door 100A is shown.

A see-through region 120A is preferably provided in the central portion of the door 100A. Further, a bezel 130A is preferably formed around the see-through window 120A. In other words, the see-through window 120A is formed in the center portion of the front face of the door 100A, and a bezel 130A is formed in a region radially outwards of the see-through window. The bezel 130A forms a marginal portion of the door in the front face of the door 100A.

According to the present embodiment, the front panel 110A is provided on the front face of the door 100A. The front panel 110A may be made of a transparent material or may be made of a glass material. For example, the panel may be made of transparent resin or made of glass.

The front panel 110A may be configured such that the front panel has a hue such that the panel looks like an opaque black display when the lighting device is off. Further, the panel may be configured such that a portion of the front panel 110A forms the see-through window, and another portion of the panel forms a bezel. In order to make the black display effect more conspicuous, a black print layer may be formed on a portion corresponding to the bezel.

The front panel 110A may be provided separately from the control panel 12A. However, in FIG. 18, an example in which the front panel 110A constitutes a part of the control panel 12A is shown. Thus, the front panel 110A substantially forms the front face of the door 110A. A portion of the front face may form the control panel 12A.

In addition, the control panel 12A is preferably located radially outward of the see-through window 120A. That is, the control panel 12A preferably forms a part of the bezel. Thus, when lighting devices such as LEDs provided in the control panel are turned off, the control panel may also look like a part of a single black display.

The bezel 130A may be provided with a sensor 500. That is, the sensor 500 may be provided radially outwards of the see-through window 120A. Thus, at least a portion of the see-through window 120A may be prevented from being blocked by the sensor 500. The sensor 500 may be the same as described above. In addition, the sensor 500 may be located at the top of the door 100A or at the bottom of the door 100A.

In the laundry treatment apparatus, most of the electrical components may be located within the control panel. Thus, it is preferred that the sensor 500 may be as close as possible to the control panel 12A or may form a part of the control panel 12A. Thus, the connection of the signal lines and the sensor installation may be very easy.

In one embodiment, in FIG. 18, a square-shaped door 100A and a circular see-through window 120A are shown. However, the home appliance according to the present embodiment may not be limited thereto. In another example, a circular door and a circular see-through window may be formed. In this case, the bezel shape may be an annular shape surrounding the see-through window. Accordingly, the shape of the door, the shape of the see-through window, and the bezel shape in the home appliance according to the present embodiment may vary.

Hereinafter, with reference to FIG. 19, the door of the home appliance shown in FIG. 18 will be described in detail.

The door 100A may include a door frame 205A. The door frame 205 may be formed of a combination between an inner frame 210A and a door liner 220A. A front panel 110A is provided in front of the inner frame. Further, a door liner 220A is provided behind the inner frame. Therefore, the door structure in this embodiment may be substantially similar to the door structure in the refrigerator as described with reference to FIGS. 5 to 8. More specifically, the structure of the door may be substantially similar to the structure of the auxiliary door in the refrigerator. Thus, when the front panel forms the front face of the door 100A. Alternatively, the inner frame 210A together with the front panel may form the front face of the door 100A. Further, the door liner 220A may form the rear face of the door 100A.

The door liner 220A may have a circular door liner hollow portion 222A defined therein. A door glass 221A is provided on the hollow portion 222A and is made of a transparent material. The user may observe the inside of the object receiving chamber from the outside through the door glass 221A. Accordingly, the door liner hollow portion 222A and the door glass 221A may constitute a see-through window 120A.

The door glass 221A may be formed in a double structure. That is, A front door glass 221A covers the hollow portion 222A. A rear door glass 221A may further protrude rearward from the hollow portion 222A. The rear door glass may be configured to protrude into the object receiving chamber 11A when the door 100A is closed.

The inner frame 210A may include a knob through-hole 211A through which the knob 13A passes, a display through-hole 212A through which the display 14A passes, and an inner frame hollow portion 214A configured to allow the user to observe the inside of the object receiving chamber. Therefore, the see-through window 120A may be formed to include the hollow portion 214A. Further, a portion radially outwards of the inner frame hollow portion 214A forms the bezel 130A as described above.

The front panel 110A is preferably made of a transparent material on the front face of the inner frame 210A. The panel 110A may be formed of an opaque material such that light transmits the panel when the lighting device is on, and light is blocked by the panel when the lighting device is off.

Accordingly, the user can visually confirm the laundry treatment process inside the object receiving chamber through the front panel 110A and the door glass 221A. However, in a dark environment, even when the front panel 110A is formed of a transparent material, the user cannot see the inside of the object receiving chamber well. Thus, if necessary, that is, when the see-through conversion is required, it is desirable to activate the lighting device. That is, it is desirable to activate the lighting device that illuminates the inside of the object receiving chamber.

In one embodiment, even when the front panel 110A is formed of an opaque material, and when the user needs the see-through conversion, it is desirable to activate the lighting device.

In this connection, when the entire front panel 110A is formed of an opaque material, the entire region of the front panel including the see-through window, that is, the see-through region may be configured to look like a black display. That is, when the lighting device is off, it seems like that the black display is mounted on the front face of the laundry treatment apparatus. Therefore, this may form a very beautiful appearance.

A plurality of fasteners 111A may be provided on the edge of the front panel 110A. The front panel 110A may be coupled to the inner frame 210A via the fasteners 111A. The fastener 111A may be implemented as a hook.

The door 100A may include a PCB assembly 150A detachably attached to the inner frame 210A. The PCB assembly may be coupled to the inner frame 210A at the rear of the inner frame 210A.

The PCB assembly 150A may be provided for a user interface. Accordingly, the PCB assembly 150A may include input interfaces to which a user may apply a specific input, and displays that display status information of the home appliance. An example of such an input interface is the knob 13A. An example of such a display may be the display 14A.

The PCB assembly 150A may a from a part of the control panel. Therefore, a part of the PCB assembly 150A may be visually exposed to the outside from the front face of the door through the inner frame 210A. In one example, a portion of the PCB assembly 150A may be configured to be covered by the front panel 110A.

Since the PCB assembly 150A is provided for an interface with the user, it is preferable that the assembly 150A is provided at a position that is maximally adapted to the eye level of the user. Accordingly, the assembly 150A is preferably positioned at the top of the door. That is, the assembly 150A is preferably coupled to the top of the inner frame 210A. In other words, at the rear of the inner frame 210A, the PCB assembly is preferably coupled to the top of the inner frame 210A. Further, at the rear of the inner frame 210A, the door liner 220A is preferably coupled to the bottom of the inner frame 210A.

The PCB assembly 150A may include a printed circuit board (PCB) 151A, a PCB support 155A for supporting the PCB, a knob 13A for receiving input from a user, and a display 14A that displays the activation status or status information of the home appliance. The PCB assembly 150A may be coupled to the inner frame 210A at the rear of the inner frame 210A.

In one embodiment, a control panel cover 160A may be provided on the back surface of the PCB support 155A. While the control panel cover 160A accommodates the PCB assembly 150A therein, the cover 160A may be coupled to the inner frame 210A. Therefore, the control panel cover 160A functions to protect the PCB assembly 150A. In addition, the cover 160A together with the door liner 220A forms a rear face of the door 100A.

The user inputs the operation of the laundry treatment apparatus according to an embodiment of the present invention using the knob 13A. The user may determine whether or not the laundry treatment apparatus operates according to the operation inputted via the display 14A.

The door 100A may be pivotally mounted on the front face cabinet 15A. Accordingly, the door 100A may further include a hinge 170A connected to the front face cabinet 15A.

The hinge 170A is coupled to one side of the door 100A and is coupled to one side of the front face cabinet 15A. Thus, the door 100A may be pivotally connected to the front face cabinet 15A.

The hinge 170A may include a hinge body 171A, at least one protrusion 173A protruding from the hinge body 171A toward the front face, a hinge shaft 175A disposed between the protrusions 173A and rotatable, and a spring 177 provided on the outer peripheral surface of the hinge shaft 175A to provide a reaction force for preventing the door from being opened or closed by its own weight. Preferably, the spring 177 may be implemented as a torsional spring.

In one embodiment, a hollow portion 16A is also formed in the front face cabinet 15A to form a see-through window. Accordingly, as the light sequentially passes through the front panel 110A, the inner frame 210A, the door liner 220A, and the front face cabinet 15A, the user may also see inside the object receiving chamber.

As in the above-described embodiments, it is also preferable in this embodiment that the sensor 500, in particular, the sensor device module is configured to be in close contact with the front panel 110A. Further, the sensor device module 510 in this embodiment may be the same as the sensor device module 510 in the above-described embodiment.

For this purpose, a through-hole 213A is preferably formed in the inner frame 210A. That is, the sensor device module 510 may extend from the rear of the inner frame 210A and pass through the through-hole 213A and be in close contact with the front panel 110A. Further, since the through-hole 213A is located radially outwards of the see-through window 120A, a situation in which the sensor 500 blocks the see-through window 120A may be avoided.

Figure 19:
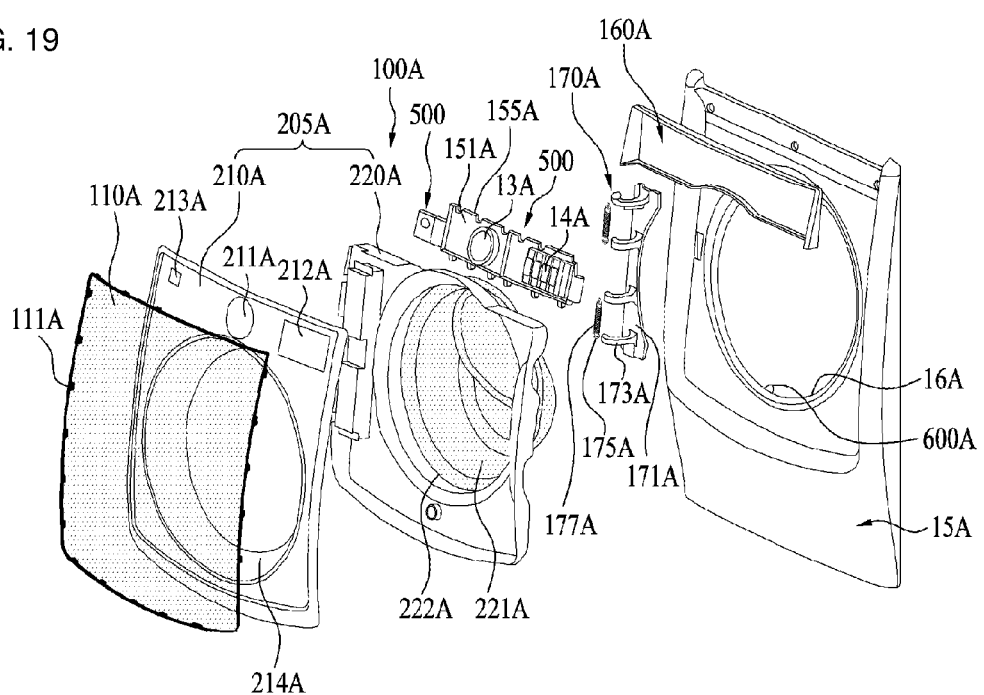
FIG. 19 is an exploded perspective view of the door shown in FIG. 18.
Figure 20:
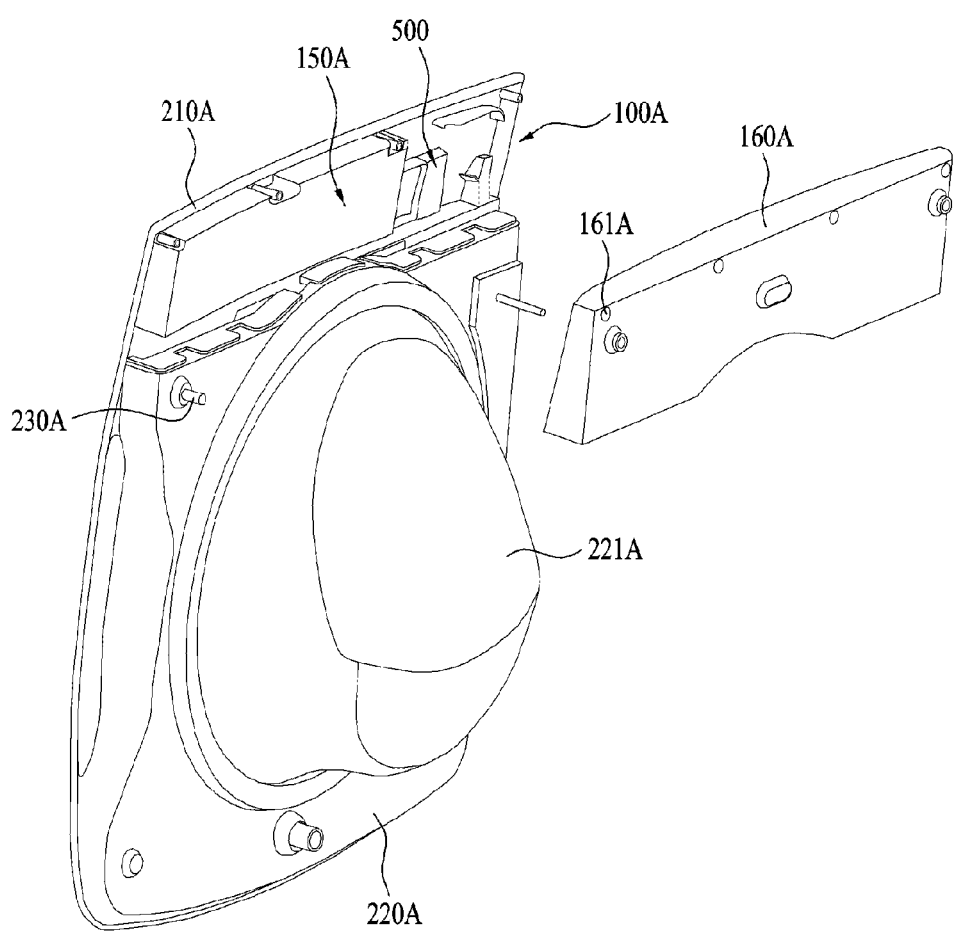
FIG. 20 is a perspective view of a state in which a control panel cover is removed from the rear of the door as shown in FIG. 18.

FIG. 20 shows an exploded view of the rear portion of the door shown in FIG. 19.

As described above, the inner frame 210A and the door liner 220A are coupled to each other. The door glass 221A configured to protrude from the door liner 220A toward the object receiving chamber 11A may be provided. Further, the PCB assembly 150A is coupled to the inner frame 210A. On the backside of the PCB assembly 150, the control panel cover 160A may be coupled to the inner frame 210A.

In this connection, the control panel cover 160A may include at least one through hole 161A. A control panel cover 160A may be coupled to the inner frame 210 by inserting a fastener (not shown) into the through-hole 161A.

This means that the control panel, in particular, the PCB assembly may be assembled very easily in the laundry treatment apparatus. In addition, this means that future maintenance of the PCB assembly is very easy. This is because the mounting of the PCB assembly is independent of the cabinet 10A.

In one embodiment, the laundry treatment apparatus according to this embodiment also includes the lighting device for illuminating the inside of the object receiving chamber for the see-through conversion.

The lighting device 600A may be provided in the front face cabinet 15A as shown in FIG. 19. The lighting device 600A may be provided inside the object receiving chamber.

In one example, in the case of a drum type washing machine, the lighting device is provided in the tub. The lighting device may illuminate the interior of the drum, which is an object receiving chamber, received in the tub. In the case of a drum type dryer, the lighting device may be provided in the front face cabinet 15A. Alternatively, the lighting device may be mounted on a front support or a rear support that supports the rotation of the drum. In the case of a refresher, like the refrigerator, the lighting device may be provided on the door or mounted inside the object receiving chamber.

Further, as in the refrigerator described above, the laundry treatment apparatus may likewise be provided with a door switch 230A. As in the previous embodiments, the activations of the door switch 230A and the lighting device 600A may be associated with each other.

For example, when, during the pause of the laundry treatment apparatus, the user opens the door, the door switch 230A senses the door opening. Thus, the door switch may control the lighting device so that the lighting device 600A is turned on.

Further, due to the nature of the laundry treatment apparatus, the lighting device needs to be controlled so that the lighting device 600A is turned on even when the door is closed. In one example, in a standby state where power is applied to the apparatus and the apparatus is waiting for the user input, or in a paused state during the operation of the apparatus, the lighting device 600A may be controlled to be activated. Further, while the laundry treatment apparatus is in operation, the lighting device may be controlled so that the lighting device 600A is basically turned off.

However, when, during the laundry treatment apparatus operation, a knock inputting for the see-through conversion is performed, the lighting device may be controlled such that the lighting device 600A is turned on. In this regard, the knock input method and the lighting device control method may be the same as those in the above-described embodiments.

Thus, the user can easily look inside the object receiving chamber via the knock input. This allows the user to visually confirm whether laundry is being properly treated. This makes it possible to greatly enhance product satisfaction.

Figure 21:
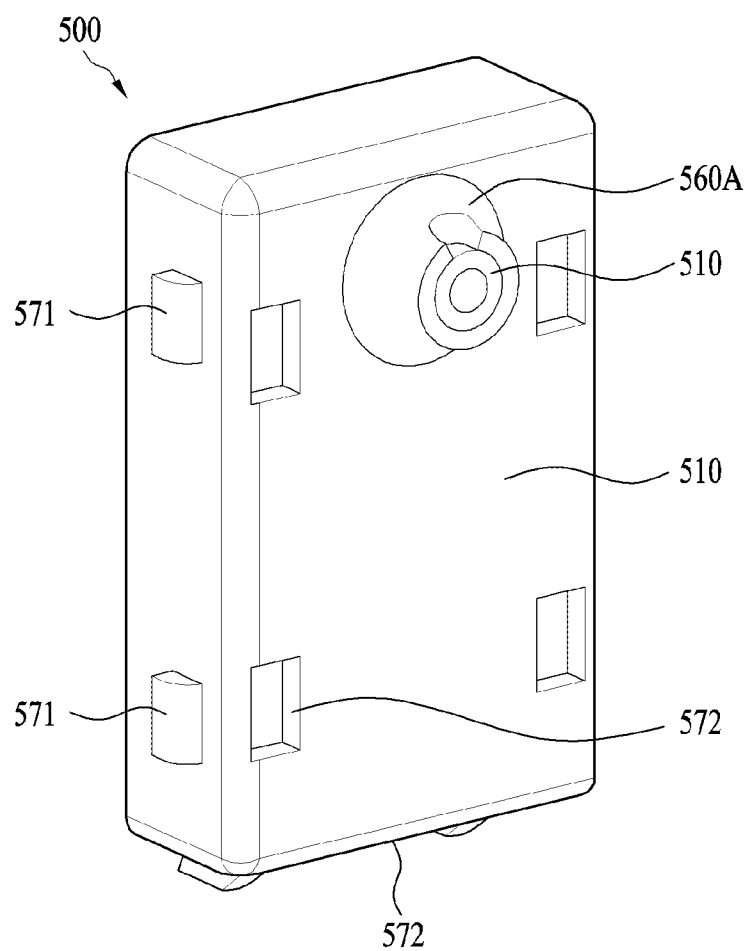
FIG. 21 is a perspective view of a sensor that may be applied to the third embodiment.
Figure 22:
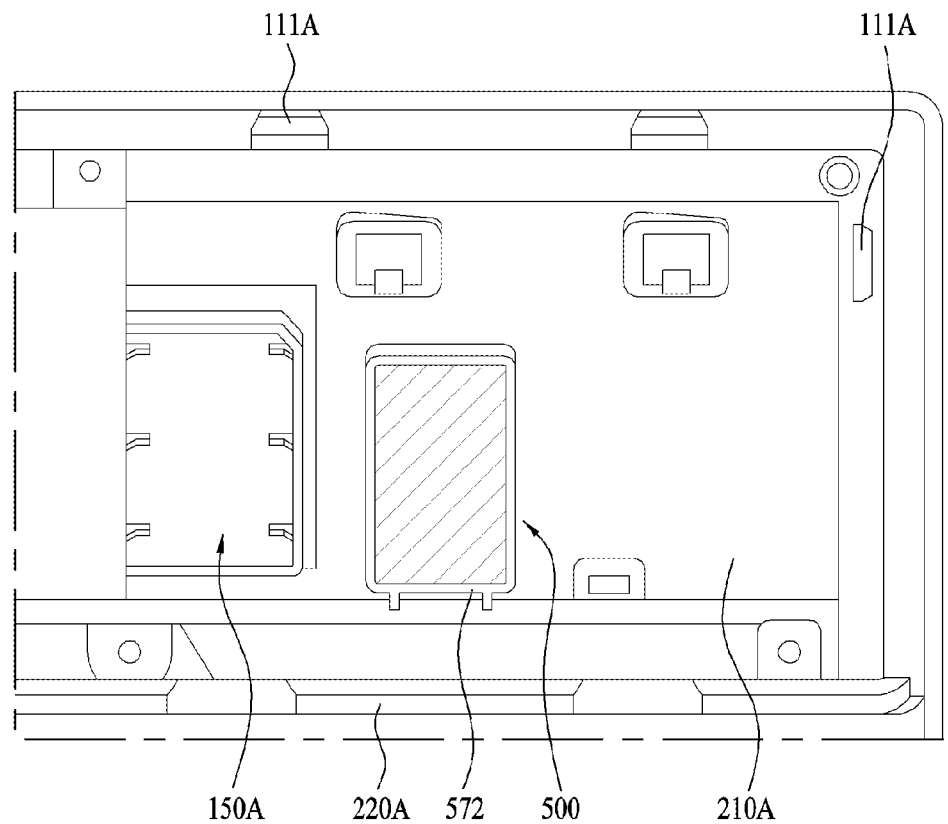
FIG. 22 is an enlarged view of a state in which the sensor shown in FIG. 21 is mounted on the door.

Hereinafter, with reference to FIGS. 21 and 22, a sensor 500, which may be applied to the laundry treatment apparatus, and a mounting structure for the above sensor are illustrated in detail.

The components and functions of the sensor 500 in this embodiment are similar to those in the above-described embodiment. However, in a home appliance that uses water, such as a washing machine, such a sensor 500 needs to be protected from water. Accordingly, the sensor 500 preferably includes a housing 570. The housing 570 may be constructed to receive a filter, an amplifier, and a PCB. In one example, a signal line connecting between the sensor device module and the PCB may be accommodated in the housing. Therefore, basically, these components may be protected from the outside. In particular, these components may be protected from moisture penetration.

A holder 560A may be provided on the housing. The holder 560A may be constructed to receive the sensor device module 510. In particular, the holder 560A preferably accommodates the module 510 such that a portion of the sensor device module 510 protrudes.

The housing 570 is mounted in close contact with the inner frame at the rear of the inner frame 210A. A portion of the holder 560A may pass through the through-hole 213A of the inner frame 210. Accordingly, it becomes possible to mount the sensor device module such that the sensor device module 510, which protrudes further forward than the holder 560A, is more closely contacted to the front panel 110A.

In one embodiment, the housing may be provided with a fastener. That is, a fastener 571 for mounting the housing 570 on the inner frame 210A may be formed. Via the fastener 571, the housing may be mounted very firmly to the inner frame. The fastener may include a plurality of hooks or screw holes. In one embodiment, it is also possible to implement the fastener as a combination of hooks and screw holes.

A connector 572 may be provided on the bottom of the housing. The sensor 500 and the controller of the PCB assembly are connected to each other through the connector 572 and a signal may be communicated between the sensor 500 and the controller of the PCB assembly.

The housing 570 may be formed as a portion of a PCB assembly. That is, as the PCB assembly 150A is mounted on the inner frame 210A, the sensor 500 may be mounted on the inner frame 210A.

In the housing 570, a coated-solution invading hole 572 may be formed. That is, an opening may be formed in the housing to allow the coated-solution to penetrate the housing to protect the electrical components from moisture. Thus, the PCB, filter, amplifier and sensor microcomputer of the sensor 500 may be further protected from moisture by the coated-solution. This invading hole 572 may be constructed so that the coated-solution is uniformly applied over these electrical components. Naturally, the coated-solution will be solidified later.

The embodiments of the refrigerator and laundry treatment apparatus as the home appliance have been described above. Hereinafter, an embodiment of cooking appliance or dishwasher is illustrated as one example of a home appliance.

Figure 23:
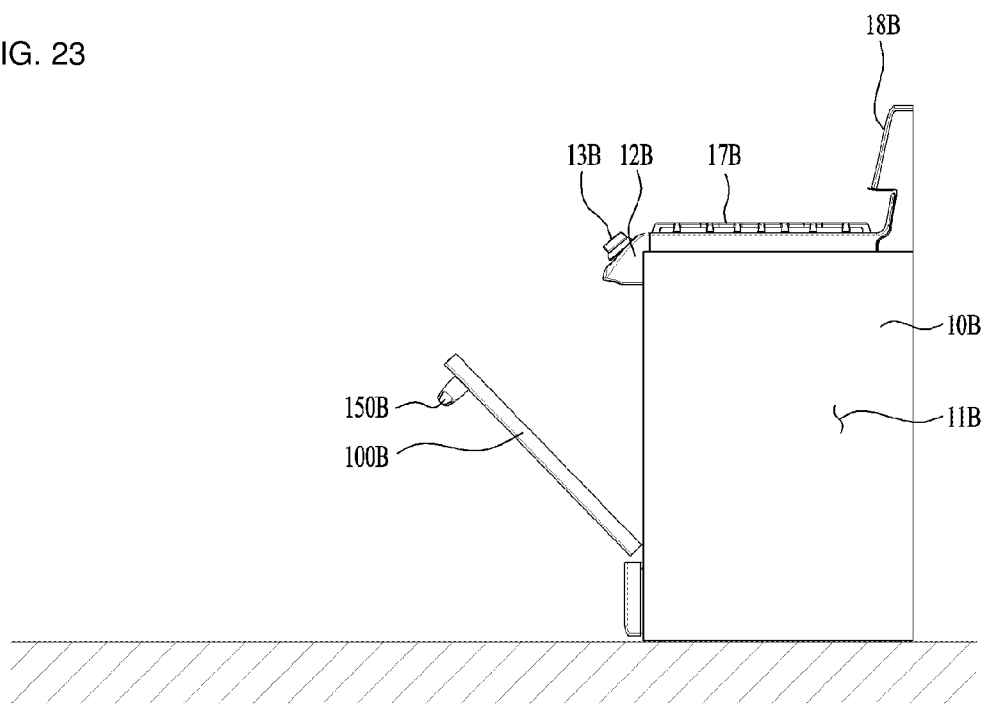
FIG. 23 is a side elevation view showing a home appliance (cooking appliance or dishwasher) according to a fourth embodiment of the present invention

FIG. 23 shows a conventional cooking appliance or dishwasher among home appliances. Specifically, a handle 150B is provided on the front face of the door 100B. In the cooking appliance or dishwasher, the door is opened and closed by pivoting around the rotation center located at the lower portion of the door.

A cooking appliance or dishwasher also includes a cabinet 10B that forms an outline. In the cabinet 10B, a chamber in which cooking is performed, or a tub in which cleaning is performed is located. Such a chamber or tub may be referred to as an object receiving chamber 11B. Similarly, a door 100B pivotally connected to the cabinet 10B is provided. The user needs to view the interior of the object receiving chamber 11B through this door 100B.

In the cooking appliance or dishwasher, a control panel 12B may also be provided that allows the user to operate the same. A manipulating interface 13B may be provided on the control panel 12B. One type of these manipulating interfaces may be a knob.

In the case of the cooking appliance, a cooktop 17B forming a separate cooking region may be provided on a top of the cabinet 10B. Further, a rear display 18B may be provided on a top of the cabinet, if necessary.

Figure 24:
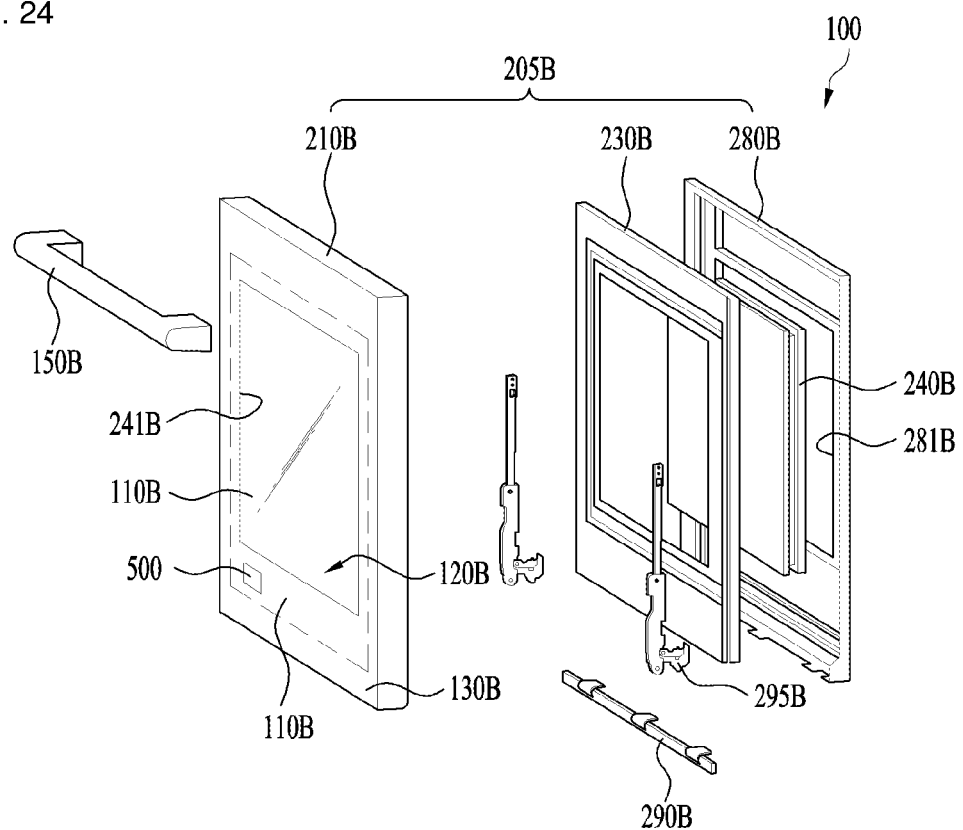
FIG. 24 is an exploded perspective view of the door as shown in FIG. 23.

Hereinafter, referring to FIG. 24, the door structure of the home appliance shown in FIG. 23 is illustrated in detail.

The door 100B is pivotably connected to the cabinet 10B. The door is configured to open and close the object receiving chamber 11B accommodating the object therein. The handle 150B is provided on the door 100B. Thus, the user holds the handle 150B and opens and closes the door 100B.

The door 100B may include a plurality of frames. These frames may be combined to form the door frame 205B.

The door frame 205B may include an outer door 210B defining a front face of the door and a door liner 280 defining a rear face of the door. A predetermined space may be defined between the outer door 210B and the door liner 280B.

An inner frame 230B may be provided between the outer door 210B and the door liner 280B. Further, hollow portions 214B, 231B, and 281B may be formed in the central regions of the frames 210B, 230B, and 280B, respectively such that the user views the inside of the object receiving chamber. These hollow portions form a see-through window 120B. Further, a thermal-insulating panel 240B and a front panel 110B corresponding to these windows may be provided.

The door structure in this embodiment may be substantially similar to that in the door embodiment illustrated with reference to FIGS. 3 to 5. This is because the door as shown in FIG. 3 also includes the outer door, the inner frame and the door liner.

The outer door 210B may be provided with a front panel 110B. The front panel 110B may be coupled to the outer door 210B to define a front of the outer door 210B. However, it is preferable that the front panel 110B is coupled to the outer door 210B to define the rear of the outer door 210B.

The front panel 110B may be larger than the hollow portion 214B of the outer door 210B. That is, the panel 110B may be constructed such that the front panel 110B completely blocks the hollow portion. The front panel 110B may be made of a glass material. The front panel 110B together with the outer door 210 form the front face of the door 100B.

The front panel 110B forms a see-through window. The knock input from the user may be applied to the front panel. Therefore, the sensor may be arranged so that the sensor 500 is closely attached to the front panel 110B. The module 510 may be mounted such that the sensor 500, in particular, the sensor device module 510, is arranged to be in close contact with the front panel at the rear of the front panel 110B. In one example, the module 510 may be mounted such that the sensor device module 510 is disposed to be in close contact with the front panel at the front of the front panel 110B. In either case, when the knock input from the user is applied to the front panel 110B, the front panel serves as a medium through which an acoustic wave generated from the knock input is transmitted. Further, the front panel 110B may serve as a medium for detecting the knock input.

A window panel 240B may be provided together with the front panel 110B. Since the window panel 240B is provided for thermal-insulation, the window panel may also be referred to as a thermal-insulating panel. Multiple layers of these thermal-insulating panels may be laminated. The window panel is preferably made of glass.

The door 100B may be provided with a hinge 295B for opening and closing the door 100B. The home appliance may have a pull-down type door. Thus, the hinge 295B may include a damper.

A shield panel 290B may be formed under the door 100B. This shield panel will perform a function similar to the cap decoration as described above.

In this embodiment, an example in which the sensor 500 is located in the lower portion of the front panel is shown. Thus, for mounting purposes, the position of the sensor 500 may be located on the side, top, bottom, or the like of the front panel. That is, the position of the sensor may be variously changed. In particular, the positional relationship between the sensor and the main controller may be considered to determine the position of the sensor.

In the foregoing, embodiments of the refrigerator, laundry treatment apparatus, cooking appliance and dishwasher as examples of home appliances, and examples of the doors applied thereto have been exemplified in detail. That is, the door that may open and close the object receiving chamber, the home appliance in which the user may view the object receiving chamber through the door, and the door of the home appliance have been illustrated in detail.

The door configured such that the front panel to which the knock input from the user is applied is located on the front face of the door and such that the sensor for sensing the knock input is mounted on the front panel in close contact with the front panel, and the home appliance having the door have been illustrated in detail.

Further, the door configured such that the sensor may be mounted radially outwards of the see-through window and, thus, the see-through window may be prevented from being interfered with the sensor, and the home appliance having the door have been illustrated in detail. In this connection, the detailed structure of the door itself may vary depending on the characteristics of the corresponding home appliances. However, the common features among these doors may be applied equally regardless of the type of the home appliance.

Further, the control configuration as illustrated with reference to FIG. 9 and the sensor device module as illustrated with reference to FIG. 10 may be applied equally or similarly, regardless of the type of the home appliance.

INDUSTRIAL APPLICABILITY

The industrial application of the present invention may be as described in the Best Mode section.

The invention claimed is:

1. A home appliance comprising:
a cabinet;
an object receiving chamber defined in the cabinet to receive an object therein;
a door pivotally coupled to the cabinet to open and close the object receiving chamber, wherein the door has a see-through window;
a lighting device for illuminating an interior of the object receiving chamber;
a sensor disposed in the door for detecting an acoustic wave, wherein the acoustic wave is generated by an application of a knock input to the door; and
a controller configured to activate the lighting device upon detecting the knock input, such that the object receiving chamber may be visible to an outside through the see-through window,
wherein the sensor includes:

a microphone for sensing the acoustic wave; and
a microphone receptor configured to receive the microphone and to be in close contact with a front panel of the door.

2. The home appliance according to claim 1, wherein the front panel is provided on a front face of the door so that the knock input is applied to the front panel.

3. The home appliance according to claim 2, wherein the front panel is configured to transmit therethrough visible light generated from the lighting device.

4. The home appliance according to claim 3, wherein the sensor includes a sensor device module,
wherein the sensor device module includes:
the microphone; and
the microphone receptor.

5. The home appliance according to claim 4, wherein the front panel is composed of a single material-based medium such that the medium is monolithic and continuous between a knock input occurrence position and a knock input sensed position.

6. The home appliance according to claim 4, wherein the sensor includes a mount member constructed for receiving the sensor device module therein and for allowing the sensor device module to be mounted on the front panel in close contact with the front panel.

7. The home appliance according to claim 1, wherein the sensor includes a modular microcomputer provided separately from the controller,
wherein the modular microcomputer is configured to receive the acoustic wave sensed by the microphone, to determine that an input from a user is the knock input based on the received wave, and to transmit the determination result to the controller.

8. The home appliance according to claim 1, wherein the door includes an inner frame coupled to the front panel on a rear of the front panel, wherein the inner frame defines a bezel of the see-through window.

9. The home appliance according to claim 8, wherein an inner frame hollow portion for defining the see-through window is formed in a central region of the inner frame.

10. The home appliance according to claim 8, wherein the bezel has a through-hole defined therein such that the sensor passes through the through-hole forwards from a rear of the inner frame and then is in close contact with the front panel.

11. The home appliance according to claim 8, wherein the door includes a door liner coupled to the inner frame on a rear of the inner frame to define a rear face of the door.

12. The home appliance according to claim 11, wherein the door includes a printed circuit board (PCB) assembly coupled to the inner frame on a rear of the inner frame, wherein the PCB assembly is disposed above the door liner.

13. The home appliance according to claim 12, wherein the door includes a control panel cover coupled to the inner frame on a rear of the PCB assembly to receive the PCB assembly therein, wherein the control panel cover together with the door liner defines a rear face of the door.

14. The home appliance according to claim 8, wherein a black printed layer is formed on the bezel.

15. The home appliance according to claim 8, wherein the sensor includes:
a filter for removing noise from a signal received from the microphone;
an amplifier for amplifying a signal output from the filter; and
a printed circuit board (PCB) on which the filter and the amplifier are mounted.

16. The home appliance according to claim 12, wherein the sensor includes:
a housing for receiving the PCB;
a holder provided on the housing, wherein the holder receives a microphone module therein such that a portion of the microphone module protrudes; and
a fastener provided on the housing for coupling the housing to the inner frame.

17. The home appliance according to claim 16, wherein the microphone receptor is made of a rubber material, wherein the coupling via the fastener allows the microphone receptor to be elastically deformed and thus be in closed contact with the front panel.

18. The home appliance according to claim 16, wherein the door includes a support member constructed for receiving the microphone receptor and for allowing the microphone module to be mounted on the front panel to be in close contact with the front panel.

19. The home appliance according to claim 11, wherein a door liner hollow portion for defining the see-through window is formed in a central region of the door liner.

20. The home appliance according to claim 19, wherein a door glass is provided on the door liner hollow portion and is inserted into the cabinet.

21. The home appliance according to claim 1, wherein the sensor is configured to sense the knock input only during operation of the home appliance to treat the object.

22. The home appliance according to claim 1, wherein the microphone receptor is in close contact with the front panel so that a sealed space is defined between the microphone receptor and the front panel to block an external noise.

23. The home appliance according to claim 22, wherein the sealed space is defined inside the microphone receptor.

24. The home appliance according to claim 1, wherein the home appliance includes at least one of a refrigerator, a laundry treatment apparatus, a cooking appliance, or a dishwasher.

* * * * *